(12) United States Patent
Higuchi et al.

(10) Patent No.: US 6,552,131 B1
(45) Date of Patent: Apr. 22, 2003

(54) BLOCK POLYMER AND ANTISTATIC AGENT COMPRISING THE SAME

(75) Inventors: Shoichi Higuchi, Kyoto (JP); Eiichi Senda, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/913,169

(22) PCT Filed: Feb. 10, 2000

(86) PCT No.: PCT/JP00/00737

§ 371 (c)(1),
(2), (4) Date: Dec. 12, 2001

(87) PCT Pub. No.: WO00/47652

PCT Pub. Date: Aug. 17, 2000

(30) Foreign Application Priority Data

| Feb. 10, 1999 | (JP) | ............................................. 11-32164 |
| Mar. 31, 1999 | (JP) | ............................................. 11-91294 |
| Nov. 24, 1999 | (JP) | ............................................. 11-332469 |
| Jan. 25, 2000 | (JP) | ............................................. 2000-16364 |

(51) Int. Cl.[7] .......................... C08L 23/04; C08L 23/26
(52) U.S. Cl. ........................ 525/240; 525/192; 525/193; 525/194; 525/195; 525/78; 525/79; 525/296; 525/298
(58) Field of Search ................................ 525/240, 192, 525/193, 194, 195, 78, 79, 296, 298, 384, 385

(56) References Cited

FOREIGN PATENT DOCUMENTS

| EP | 0 634 424 A1 | | 1/1995 |
| EP | 0 931 805 | * | 7/1999 |
| JP | 01163234 A | | 6/1989 |
| JP | 03290464 A | | 12/1991 |
| JP | 06240148 A | | 8/1994 |
| JP | 6-322050 | * | 11/1994 |
| JP | 10-310618 | * | 11/1998 |
| JP | 10-324662 | * | 12/1998 |

* cited by examiner

Primary Examiner—James J. Seidleck
Assistant Examiner—Olga Asinovsky
(74) Attorney, Agent, or Firm—Sughrue Mion, PLLC

(57) ABSTRACT

The present invention provides a block polymer comprising a polyolefin and a hydrophilic polymer, being finely dispersed in resins, in particular polyolefins, without requiring any compatibilizer, and giving thermoplastic resin compositions, said compositions giving moldings having permanent antistatic properties at low block polymer addition levels even when they are produced by a method involving no shearing and having excellent mechanical strength as well as having an excellent compatibility so as to avoid molding or roll pollution at their formation.

The present invention provides a block polymer (A)

which has a structure such that blocks of a polyolefin (a) and blocks of a hydrophilic polymer (b) having a volume resistivity of $10^5$ to $10^{11}$ Ω·cm are bonded together alternately and repeatedly;

an antistatic agent comprising the block polymer (A);

a resin composition comprising the block polymer (A) and a thermoplastic resin (B); and a molded product obtainable by coating or printing a molding comprised of a resin composition containing the block polymer (A).

29 Claims, No Drawings

BLOCK POLYMER AND ANTISTATIC AGENT COMPRISING THE SAME

TECHNICAL FIELD

The present invention relates to a block polymer and an antistatic agent comprising the same.

More particularly, it relates to a block polymer for use as an antistatic agent suited for use in coated or printed moldings and an antistatic agent comprising the same.

BACKGROUND ART

Any block polymer having a structure comprising repetitions of a polyolefin block and a hydrophilic polymer block is not known in the art.

On the other hand, the method generally employed for providing a thermoplastic resin such as a polyolefin with permanent antistatic properties comprises incorporating an antistatic agent such as a polyetheresteramide in the resin and a method for improving the compatibility between a polyolefin and a polyetheresteramide which comprises using an acid-modified high-molecular-weight polyolefin in combination is known (e.g. Japanese Kokai Publication Hei-01-16234, Japanese Kokai Publication Hei-03-290464, etc.).

However, this method is disadvantageous in that the polyetheresteramide is hardly oriented on the surface of moldings of a crystalline polyolefin and, in extrusion molding or compression molding in which no shearing action is produced, it is necessary to add a large amount of the antistatic agent, such as a polyetheresteramide.

Furthermore, the compatibility is insufficient, which raises the problem of mold contamination and/or roll contamination in the step of molding.

In addition, since a compatibilizer is required in large amounts to raise the compatibility with the resin, the mechanical strength and moldability of the resin decrease, and this problem has not been solved as yet.

Consequently, an antistatic agent which might give polyolefin resin compositions excellent in permanent antistatic properties and mechanical strength at low addition levels irrespective of molding method has been earnestly demanded.

SUMMARY OF THE INVENTION

As a result of intensive investigations made by them to solve the above problems, the present inventors found that a block polymer comprising a polyolefin and a hydrophilic polymer is finely dispersed in resins, in particular polyolefins, without requiring any compatibilizer, giving thermoplastic resin compositions which gives moldings having permanent antistatic properties at low block polymer addition levels even when they are produced by a method involving no shearing and which are also excellent in mechanical strength, and that the block polymer has good compatibility, hence causes no mold contamination or roll contamination. These findings have led to completion of the present invention.

Thus, the present invention provides a block polymer (A) which has a structure such that blocks of a polyolefin (a) and blocks of a hydrophilic polymer (b) having a volume resistivity of $10^5$ to $10^{11}$ Ω·cm are bonded together alternately and repeatedly;

an antistatic agent comprising said block, polymer (A);

a resin composition comprising said polymer (A) and a thermoplastic resin (B); and a molded product obtainable by coating or printing a molding comprised of a resin composition containing said block polymer (A).

DETAILED DISCLOSURE OF THE INVENTION

The block polymer (A) of the invention has a structure such that blocks of (a) and blocks of (b) are bonded together alternately and repeatedly via at least one bonding mode selected from the group consisting of ester bonding, amide bonding, ether bonding, urethane bonding and imide bonding.

Usable as the blocks of polyolefin (a) constituting the block polymer (A) are a polyolefin (a1) having carbonyl groups (preferably a carboxyl group; hereinafter the same shall apply) at both polymer termini, a polyolefin (a2) having hydroxyls at both polymer termini and a polyolefin (a3) having amino groups at both polymer termini.

Further, a polyolefin (a4) having a carbonyl group at one polymer terminus, a polyolefin (a5) having a hydroxyl at one polymer terminus and a polyolefin (a6) having an amino group at one polymer terminus can be used.

Among them, the carbonyl-containing polyolefins (a1) and (a4) are preferred in view of their easy modifiability.

Usable as (a1) are those derived from a polyolefin (a0) comprising a polyolefin modifiable at both termini as a main constituent (content not less than 50%, preferably not less than 75%) by carbonyl group introduction at both termini.

Usable as (a2) are those derived from (a0) by hydroxyl group introduction at both termini.

Usable as (a3) are those derived from (a0) by amino group introduction at both termini.

As (a0), there may be mentioned polyolefins obtainable by polymerization of one or a mixture of two or more of olefins containing 2 to 30 carbon atoms (preferably olefins containing 2 to 12 carbon atoms, in particular preferably propylene and/or ethylene) and low-molecular-weight polyolefins obtainable by thermal degradation of high-molecular-weight polyolefins (polyolefins obtainable by polymerization of olefins containing 2 to 30 carbon atoms, preferably 2 to 12 carbon atoms, in particular preferably polypropylene and/or polyethylene).

The number average molecular weight (hereinafter referred to as Mn for short) of (a0) as determined by gel permeation chromatography is generally 800 to 20,000, preferably 1,000 to 10,000, in particular preferably 1,200 to 6,000.

The measurement conditions for Mn are as follows (hereinafter, all Mn data are those determined under the same conditions).

Apparatus: High temperature gel permeation chromatograph (GPC)
Solvent: Orthodichlorobenzene
Reference material: Polystyrene
Sample concentration: 3 mg/ml
Column temperature: 135° C.

(a0) contains 1 to 40, preferably 1 to 30, in particular preferably 4 to 20, double bonds per 1,000 carbon atoms.

Preferred from the easy modifiability viewpoint are low-molecular-weight polyolefins obtainable by thermal degradation (in particular polyethylene and polypropylene with an Mn of 1,200 to 6,000).

Low-molecular-weight polyolefins obtainable by thermal degradation have an Mn in the range of 800 to 6,000 and contain, on an average, 1.5 to 2 terminal double bonds per molecule [Katsuhide Murata and Tadahiko Makino, Journal of the Chemical Society of Japan, page 192 (1975)].

Such low-molecular-weight polyolefins obtainable by thermal degradation can be obtained, for example, by the method described in Japanese Kokai Publication Hei-03-62804.

Usable as (a4) are those derived from a polyolefin (a00) comprising a polyolefin modifiable at one terminus as a main constituent (content not less than 50%, preferably not less than 75%) by carbonyl group introduction at one terminus.

Usable as (a5) are those derived from (a00) by hydroxyl group introduction at one terminus.

Usable as (a6) are those derived from (a00) by amino group introduction at one terminus.

The (a00) can be obtained in the same manner as (a0) and the Mn of (a00) is generally 2,000 to 50,000, preferably 2,500 to 30,000, in particular preferably 3,000 to 20,000.

The (a00) contains 0.3 to 20, preferably 0.5 to 15, in particular preferably 0.7 to 10, double bonds per 1,000 carbon atoms.

Preferred from the easy modifiability viewpoint are low-molecular-weight polyolefins obtainable by thermal degradation (in particular polyethylene and polypropylene with an Mn of 2,000 to 20,000).

Low-molecular-weight polyolefins obtained by thermal degradation have an Mn in the range of 5,000 to 30,000 and contain, on an average, 1 to 1.5 terminal double bonds per molecule.

The (a0) and the (a00) are generally obtained as a mixture thereof. The mixture of these may be used as such or each may be used after separation and purification. From the production cost viewpoint, however, the mixture is preferably used.

Usable as (a1) are carbonyl-containing polyolefins (a1-1) derived from (a0) by modifying both termini with an $\alpha,\beta$-unsaturated carboxylic acid (anhydride), carbonyl-containing polyolefins (a1-2) derived from (a1-1) by secondary modification with a lactam or amino carboxylic acid, carbonyl-containing polyolefins (a1-3) derived from (a0) by modification by oxidation with oxygen and/or ozone or by oxo process hydroformylation, carbonyl-containing polyolefins (a1-4) derived from (a1-3) by secondary modification with a lactam or amino carboxylic acid, and mixtures of two or more of these.

The (a1-1) can be obtained by modifying (a0) with an $\alpha,\beta$-unsaturated carboxylic acid (anhydride) (this term means an $\alpha,\beta$-unsaturated carboxylic acid and/or the acid anhydride thereof; hereinafter the same shall apply).

As the $\alpha,\beta$-unsaturated carboxylic acid (anhydride) to be used for modification, there may be mentioned monocarboxylic acids and dicarboxylic acids, and anhydrides thereof, for example (meth)acrylic acid, maleic acid (anhydride), fumaric acid, itaconic acid (anhydride), citraconic acid (anhydride) and the like.

Among them, maleic acid (anhydride) and fumaric acid are preferred, and maleic acid (anhydride) is particularly preferred.

The amount of the $\alpha,\beta$-unsaturated carboxylic acid (anhydride) to be used formodification is generally 0.5 to 40%, preferably 1 to 30%, based on the weight of (a0) or (a00) (in the above and subsequent description, % means % by weight).

The modification with an $\alpha,\beta$-unsaturated carboxylic acid (anhydride) can be effected by thermally causing the $\alpha,\beta$-unsaturated carboxylic acid (anhydride) to add to the terminal double bond(s) of (a0) (ene reaction) by the solution or melting method.

The temperature for effecting the reaction of (a0) with the $\alpha,\beta$-unsaturated carboxylic acid (anhydride) is generally 170 to 230° C.

The (a1-2) can be obtained by secondarily modifying (a1-1) with a lactam or amino carboxylic acid.

As the lactam to be used for the secondary modification, there may be mentioned lactams containing 6 to 12 carbon atoms, for example caprolactam, enantholactam, laurolactam and undecanolactam.

As the amino carboxylic acid, there may be mentioned amino carboxylic acids containing 2 to 12 carbon atoms, for example amino acids such as glycine, alanine, valine, leucine, isoleucine and phenylalanine, $\omega$-aminocaproic acid, $\omega$-aminoenanthic acid, $\omega$-aminocaprylic acid, $\omega$-aminopelargonic acid, $\omega$-aminocapric acid, 11-aminoundecanoic acid and 12-aminododecanoic acid.

Preferred among them are caprolactam and 12-aminododecanoic acid.

The amount of the lactam or amino carboxylic acid to be used for the secondary modification is, when expressed in terms of number of molecules, 0.1 to 50, preferably 0.3 to 20, particularly preferably 0.5 to 10, in particular preferably 1, per residue of the $\alpha,\beta$-unsaturated carboxylic acid (anhydride) in (a1-1).

The (a1-3) can be obtained by oxidation of (a0) with oxygen and/or ozone or by oxo process hydroformylation of (a0).

The carbonyl group introduction by oxidation can be realized, for example, by the method described in U.S. Pat. No. 3,692,877.

The (a1-4) can be obtained by secondarily modifying (a1-3) with a lactam or amino carboxylic acid.

The lactam or amino carboxylic acid to be used is the same as that to be used in producing (a1-2).

The Mn of (a1) is generally 800 to 25,000, preferably 1,000 to 20,000, in particular preferably 2,500 to 10,000.

An Mn in the range of 800 to 25,000 is preferred from the viewpoint of heat resistance and of the reactivity with the hydrophilic polymer (b) to be specifically mentioned later herein.

The acid value of (a1) is generally 4 to 280 (mg KOH/g; hereinafter numerical values alone are given), preferably 4 to 100, in particular preferably 5 to 50.

An acid value within the above range is preferred from the viewpoint of the reactivity with the hydrophilic polymer (b) to be mentioned later herein.

Usable as (a2) are hydroxyl group-containing polyolefins derived from (a1) by modification with a hydroxylamine, and mixtures of two or more of them.

Hydroxylamine species that can be used for modification are hydroxylamines containing 2 to 10 carbon atoms, for example 2-aminoethanol, 3-aminopropanol, 1-amino-2-propanol, 4-aminobutanol, 5-aminopentanol, 6-aminohexanol and 3-aminomethyl-3,5,5-trimethylcyclohexanol.

2-Aminoethanol is preferred among them.

The modification with a hydroxylamine can be effected by reacting (a1) directly with the hydroxylamine.

The reaction temperature is generally 120 to 230° C.

The amount of the hydroxyl groups to be used for the modification with the hydroxylamine is 0.1 to 2, preferably 0.3 to 1.5, particularly preferably 0.5 to 1.2, in particular preferably 1, per residue of the $\alpha,\beta$-unsaturated carboxylic acid (anhydride) in (a1).

The Mn of (a2) is generally 800 to 25,000, preferably 1,000 to 20,000, in particular preferably 2,500 to 10,000.

An Mn in the range of 800 to 25,000 is preferred from the viewpoint of heat resistance and of the reactivity with the hydrophilic polymer (b) to be specifically mentioned later herein.

The hydroxyl value of (a2) is generally 4 to 280 (mg KOH/g; hereinafter numerical values alone are given), preferably 4 to 100, in particular preferably 5 to 50.

A hydroxyl value within the above range is preferred from the viewpoint of the reactivity with the hydrophilic polymer (b) to be mentioned later herein.

Usable as (a3) are amino-containing polyolefins derived from (a1) by modification with a diamine (Q1-3), and mixtures of two or more of them.

As species of the diamine (Q1-3) which can be used for the above modification, there may be mentioned diamines containing 2 to 18 carbon atoms, preferably 2 to 12 carbon atoms, for example ethylenediamine, hexamethylenediamine, heptamethylenediamine, octamethylenediamine and decamethylenediamine.

Ethylenediamine is preferred among them, however.

The modification with the diamine can be effected by reacting (a1) directly with the diamine (Q1-3).

The reaction temperature is generally 120 to 230° C.

The amount of the diamine to be used for the modification is, when expressed in terms of number of amino groups, 0.1 to 2, preferably 0.3 to 1.5, particularly preferably 0.5 to 1.2, in particular preferably 1, per residue of the α,β-unsaturated carboxylic acid (anhydride) in (a1).

The Mn of (a3) is generally 800 to 25,000, preferably 1,000 to 20,000, in particular preferably 2,500 to 10,000.

An Mn in the range of 800 to 25,000 is preferred from the viewpoint of heat resistance and of the reactivity with the hydrophilic polymer (b) to be specifically mentioned later herein.

The amine value of (a3) is generally 4 to 280 (mg KOH/g; hereinafter numerical values alone are given), preferably 4 to 100, in particular preferably 5 to 50.

An amine value within the above range is preferred from the viewpoint of the reactivity with the hydrophilic polymer (b) to be mentioned later herein.

Usable as (a4) are carbonyl-containing polyolefins (a4-1) derived from (a00) by modifying one terminus with an α,β-unsaturated carboxylic acid (anhydride), carbonyl-containing polyolefins (a4-2) derived from (a4-1) by secondary modification with a lactam or amino carboxylic acid, carbonyl-containing polyolefins (a4-3) derived from (a00) by modification by oxidation with oxygen and/or ozone or by oxo process hydroformylation, carbonyl-containing polyolefins (a4-4) derived from (a4-3) by secondary modification with a lactam or amino carboxylic acid, and mixtures of two or more of these.

(a4) can be obtained in the same manner as (a1).

The Mn of (a4) is generally 800 to 50,000, preferably 1,000 to 30,000, in particular preferably 2,000 to 20,000.

An Mn in the range of 800 to 50,000 is preferred from the viewpoint of heat resistance and of the reactivity with the hydrophilic polymer (b) to be specifically mentioned later herein.

The acidvalue of (a4) is preferably to 70, in particular preferably 2 to 50.

An acid value within this range is preferred from the viewpoint of reactivity with the hydrophilic polymer (b) to be mentioned later herein.

Usable as (a5) are polyolefins (a5-1) derived from (a4) by modification with a hydroxylamine, and mixtures of two or more of these.

(a5) can be obtained in the same manner as (a2).

The Mn of (a5) is generally 800 to 50,000, preferably 1,000 to 30,000, in particular preferably 2,000 to 20,000.

An Mn in the range of 800 to 50,000 is preferred from the viewpoint of heat resistance and of the reactivity with the hydrophilic polymer (b) to be specifically mentioned later herein.

The hydroxyl value of (a5) is preferably 1 to 70, in particular preferably 2 to 50.

A hydroxyl value within this range is preferred from the viewpoint of the reactivity with the hydrophilic polymer (b) to be mentioned later herein.

Usable as (a6) are polyolefins derived from (a4) by modification with diamine (Q1-3), and mixtures of two or more of these.

(a6) can be obtained in the same manner as (a3).

The Mn of (a6) is generally 800 to 50,000, preferably 1,000 to 30,000, in particular preferably 2,000 to 20,000.

An Mn in the range of 800 to 50,000 is preferred from the viewpoint of heat resistance and of the reactivity with the hydrophilic polymer (b) to be specifically mentioned later herein.

The amine value of (a6) is preferably 1 to 70, in particular preferably 2 to 50.

An amine value within this range is preferred from the viewpoint of reactivity with the hydrophilic polymer (b) to be mentioned later herein.

(a1) and (a4) are generally obtained as a mixture thereof. The mixture of these may be used as such or each may be used after separation and purification. From the production cost viewpoint, however, the mixture is preferably used.

(a2) and (a5) or (a3) and (a6) may also be used in the form of a mixture and, from the production cost viewpoint, the use thereof in mixture form is preferred.

Usable as the hydrophilic polymer (b), which constitutes the block polymer (A), are polyethers (b1), polyether-containing hydrophilic polymers (b2), cationic polymers (b3) and anionic polymers (b4).

Usable as (b1) are polyether diols (b1-1), polyether diamines (b1-2), and modifications (b1-3) of these.

Usable as (b2) are polyetheresteramides (b2-1) having the segment of a polyether diol (b1-1) as the polyether segment forming component, polyetheramideimides (b2-2) similarly having the segment of (b1-1), polyetheresters (b2-3) similarly having the segment of (b1-1), polyetheramides (b2-4) similarly having the segment of (b1-2), and polyetherurethanes (b2-5) similarly having the segment of (b1-1) or (b1-2).

Usable as (b3) are cationic polymers having, within the molecule, 2 to 80, preferably 3 to 60, cationic groups (c2) separated by a nonionic molecular chain (c1).

Usable as (b4) are anionic polymers comprising a sulfo-containing dicarboxylic acid (e1) and a diol (b0) or polyether (b1) as an essential constituent unit and having 2 to 80, preferably 3 to 60, sulfonyl groups within the molecule.

The hydrophilic polymer (b) has a volume resistivity (as measured by the method to be mentioned later herein in an atmosphere of 23° C. and 50% RH) of $10^5$ to $10^{11}$ Ω·cm, preferably $10^6$ to $10^9$ Ω·cm.

When the volume resistivity exceeds $1 \times 10^{11}$ Ω·cm, the antistatic property decreases.

Among the species of (b), the polyethers (b1) are first explained.

Among the (b1) species, the polyether diols (b1-1) have a structure obtained by the addition reaction of an alkylene oxide with the diols (b0) and are mentioned by the general formula: H—(OA$^1$)m—O—E$^1$—O—(A$^1$O)m'—H.

In the above formula, E$^1$ represents the residue derived from the diol (b0) by removal of the hydroxyl groups, A$^1$ represents an alkylene group containing 2 to 4 carbon atoms and m and m' each represents the number of moles of the alkylene oxide added to each hydroxyl group of the diol (b0).

The m of (OA$^1$) groups and m' of (A$^1$O) groups may be the same or different and, when these are constituted of two or more oxyalkylene group species, the mode of binding maybe blockwise, random or a combination of these.

Each of m and m' is generally an integer of 1 to 300, preferably 2 to 250, in particular preferably 10 to 100.

The m and m' may be the same or different.

As the diol (b0), there maybe mentioned dihydric alcohols (e.g. aliphatic, alicyclic or aromatic dihydric alcohols containing 2 to 12 carbon atoms), dihydric phenols containing 6 to 18 carbon atoms and tertiary amino group-containing diols.

The aliphatic dihydric alcohols include, among others, alkylene glycols (ethylene glycol, propylene glycol), 1,4-butanediol, 1,6-hexanediol, neopentyl glycol and 1,12-dodecanediol.

The alicyclic dihydric alcohols include, among others, cyclohexanedimethanol and the like, and the aromatic dihydric alcohols include, among others, xylylenediol and the like.

The dihydric phenols include, among others, monocyclic dihydric phenols (hydroquinone, catechol, resorcinol, urushiol, etc.), bisphenols (bisphenol A, bisphenol F, bisphenol S, 4,4'-dihydroxydiphenyl-2,2-butane, dihydroxybiphenyl, etc.) and condensed polycyclic dihydric phenols (dihydroxynaphthalene, binaphthol, etc.

The tertiary amino group-containing diols include, among others, bishydroxyalkylation products derived from aliphatic or alicyclic primary monoamines containing 1 to 12 carbon atoms (methylamine, ethylamine, cyclopropylamine, 1-propylamine, 2-propylamine, amylamine, isoamylamine, hexylamine, 1,3-dimethylbutylamine, 3,3-dimethylbutylamine, 2-aminoheptane, 3-aminoheptane, cyclopentylamine, hexylamine, cyclohexylamine, heptylamine, nonylamine, decylamine, undecylamine, dodecylamine, etc.) and bishydroxyalkylation products derived from aromatic primary monoamines containing 6 to 12 carbon atoms (aniline, benzylamine, etc.).

Preferred among them are aliphatic dihydric alcohols and bisphenols, in particular ethylene glycol and bisphenol A.

The polyether diols (b1-1) can be produced by the addition reaction of an alkylene oxide to the diols (b0).

Usable as the alkylene oxide are alkylene oxides containing 2 to 4 carbon atoms (ethylene oxide, propylene oxide, 1,2-, 1,4-, 2,3-or 1,3-butylene oxide) and combination systems comprising two or more of these, if necessary together with a small proportion (e.g. not more than 30% based on the whole alkylene oxide weight) of one or more of other alkylene oxides and/or substituted alkylene oxides (hereinafter collectively referred to as alkylene oxides), for example α-olefin oxides containing 5 to 12 carbon atoms, styrene oxide and epihalohydrins (epichlorohydrin etc.).

In cases that two or more alkylene oxides are used in combination, the mode of binding may be random and/or blockwise.

Preferred as the alkylene oxides are ethylene oxide used singly and ethylene oxide in combination with another or other alkylene oxides (blockwise or random addition).

The number of moles of the alkylene oxide added per hydroxyl group of (b0) is generally an integer of 1 to 300, preferably 2 to 250, in particular preferably 10 to 100.

The addition of the alkylene oxide(s) can be carried out by any of known methods, for example in the presence of an alkali catalyst at a temperature of 100 to 200° C.

The content of oxyalkylene units containing 2 to 4 carbon atoms in (b1-1) is generally 5 to 99.8%, preferably 8 to 99.6%, in particular preferably 10 to 98%.

The content of oxyethylene units in the polyoxyalkylene chains is generally 5 to 100%, preferably 10 to 100%, still more preferably 50 to 100%, in particular preferably 60 to 100%.

Usable as the polyether diamines (b1-2) are those represented by the general formula:

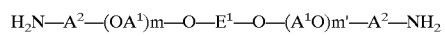

$H_2N-A^2-(OA^1)m-O-E^1-O-(A^1O)m'-A^2-NH_2$ wherein the symbols $E^1$, $A^1$, m and m' are as defined above and $A^2$ is an alkylene group containing 2 to 4 carbon atoms and $A^1$ and $A^2$ may be the same or different.

In (b1-2) can be obtained by converting the hydroxyl groups of (b1-1) to amino groups by any of known methods, for example by cyanoalkylating each hydroxyl group of (b1-1) and reducing the resulting terminus to give an amino group.

Thus, (b1-2) can be produced, for example, by reacting (b1-1) with acrylonitrile and hydrogenating the resulting cyanoethylation product.

As the modifications (b1-3), there maybe mentioned, for example, amino carboxylic acid modifications (amino-terminated), isocyanate modifications (isocyanato-terminated) and epoxy modifications (epoxy-terminated) of (b1-1) or (b1-2).

The amino carboxylic acid modifications can be obtained by reacting (b1-1) or (b1-2) with an amino carboxylic acid or lactam.

The isocyanate modifications can be obtained by reacting (b1-1) or (b1-2) with an organic diisocyanate, which is to be mentioned later herein, or reacting (b1-2) with phosgene.

The epoxy modifications can be obtained by reacting (b1-1) or (b1-2) with an epoxide (diglycidyl ether, diglycidyl ester, alicyclic diepoxide or like epoxy resin: epoxy equivalent 85 to 600) or reacting (b1-1) with an epihalohydrin (e.g. epichlorohydrin).

The Mn of the polyethers (b1) is generally 150 to 20,000 and, from the viewpoint of heat resistance and of the reactivity with (a), it is preferably 300 to 20,000, more preferably 1,000 to 15,000, in particular preferably 1,200 to 8,000.

The polyether-containing hydrophilic polymers (b2) are now explained.

Included among (b2) are those represented by the following general formula (19):

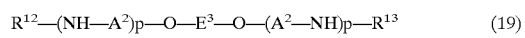

$$R^{12}-(NH-A^2)p-O-E^3-O-(A^2-NH)p-R^{13} \qquad (19)$$

In formula (19), $E^3$ represents the residue of a polyether group-containing hydrophilic polymer, $R^{12}$ and $R^{13}$ each represents a hydrogen atom or a group represented by the formula —CO—NH—$E^2$—NHCOO—$R^{14}$—NH$_2$, —CO—NH—$E^2$—NCO, —G or —CH$_2$CH(OH)CH$_2$—O—$E^4$—O—G, p is 0 or 1, $A^2$ is an alkylene group containing 2 to 4 carbon atoms or a group represented by the formula —($R^{15}$—CO)r—, $R^{15}$ is a divalent hydrocarbon group containing 1 to 11 carbon atoms, r is an integer of 1 to 10, $R^{14}$ is a divalent hydrocarbon group containing 2 to 12 carbon atoms (hereinafter this term includes saturated hydrocarbon groups and unsaturated hydrocarbon groups), $E^2$ is the residue of an organic diisocyanate, G is a glycidyl group and $E^4$ represents the residue of a diglycidyl ether (G—O—$E^4$—O—G) after removal of the glycidyloxy groups.

Preferred as each of $R^{12}$ and $R^{13}$ are a hydrogen atom and groups represented by the formula —CO—NH—$E^2$—NCO, particularly preferred is a hydrogen atom.

As $E^3$ in formula (19), there may be mentioned residues represented by the general formula (20):

$$[E^5-D-Z]w-(D-E^5)u- \qquad (20)$$

In formula (20), $E^5$ is the residue of a polyether (b1), D is an oxygen atom and/or an imino group, Z is the segment of a polymer selected from the group consisting of polyester amides, polyamide imides, polyesters, polyamides and polyurethanes, preferably groups represented by the general formula (21) to (27) given below, and u is 0 or 1.

w represents the number of repetitions of the constituent unit ($E^5$—D—Z) of the hydrophilic polymer and generally is an integer of 2 to 50, preferably 3 to 30. A value of w within this range is preferred from the viewpoint of antistatic properties and of the moldability of the resin composition comprising the block polymer (A).

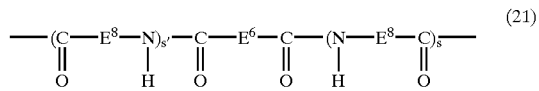

(21)

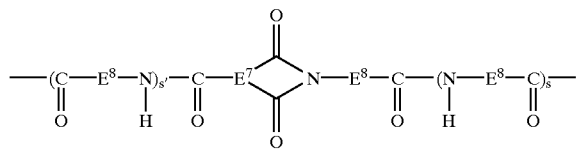

(22)

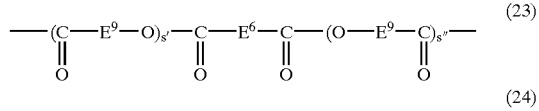

(23)

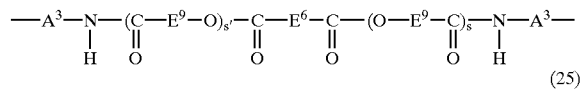

(24)

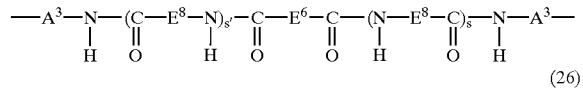

(25)

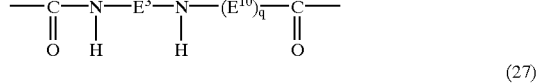

(26)

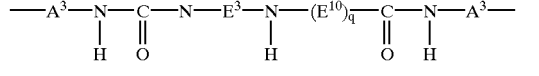

(27)

In the above formulas, $E^6$ is the residue of a dicarboxylic acid containing 4 to 20 carbon atoms after removal of the carboxyl groups, $E^7$ is the residue of a tribasic or tetrabasic aromatic carboxylic acid after removal of three carboxyl groups, $E^8$ is the residue of a polyamide constituent selected from the group consisting of monoamides from a dicarboxylic acid containing 4 to 12 carbon atoms and a diamine (Q1-3) containing 2 to 12 carbon atoms and aminocarboxylic acids containing 6 to 12 carbon atoms after removal of the terminal amino and carboxyl groups, $E^9$ is the residue of a polyester constituent selected from the group consisting of esters of a dicarboxylic acid containing 4 to 12 carbon atoms and the above-mentioned diol (b0) and hydroxy carboxylic acids containing 6 to 12 carbon atoms after removal of the terminal hydroxyl and carboxyl groups, s, s' and s" each is an integer of 0 or 1 to 50, (s+s') is at least one, $A^3$ is an alkylene group containing 2 to 4 carbon atoms or a group represented by the formula —$R^{16}$—CO—, $R^{16}$ is a divalent hydrocarbon group containing 1 to 11 carbon atoms, q is an integer of 0 or 1 to 10, $E^{10}$ is a group represented by the formula —CO—D—$E^{11}$—D—CO—NH—$E^2$—NH—, $E^2$ is the residue of an organic diisocyanate, D is an oxygen atom and/or an imino group and $E^{11}$ is the residue of a chain extender.

The polyetheresteramides (b2-1) are constituted of a carboxyl-terminated polyamide (Q1) and a polyetherdiol (b1-1).

In (b2-1), Z in $E^3$ represented by the general formula (20) is a polyamide segment represented by the general formula (21).

Usable as (Q1) are ring opening polymerization products derived from a lactam (Q1-1); polycondensates of an amino carboxylic acid (Q1-2); amides (Q1-5) from a dicarboxylic acid (Q1-4) and a diamine (Q1-3); and mixtures of these.

(Q1-4) may also be used as a molecular weight modifier in the step of polymerization.

As the lactam (Q1-1), there may be mentioned lactams containing 6 to 12 carbon atoms, for example caprolactam, enantholactam, laurolactam and undecanolactam.

As the amino carboxylic acid (Q1-2) there may be mentioned amino carboxylic acid containing 6 to 12 carbon atoms, for example ω-aminocaproic acid, ω-aminoenanthic acid, ω-aminocaprylic acid, ω-aminopelargonic acid, ω-aminocapric acid, 11-aminoundecanoic acid and 12-aminododecanoic acid.

The diamine (Q1-3) includes aliphatic diamines containing 2 to 20 carbon atoms (ethylenediamine, propylenediamine, hexamethylenediamine, 1,12-dodecanediamine, etc.), alicyclic diamines containing 6 to 15 carbon atoms (1,4-cyclohexylenediamine, isophoronediamine, 4,4'-diaminocyclohexylmethane, etc.), araliphatic diamines containing 8 to 15 carbon atoms (xylylenediamine etc.) and aromatic diamines containing 6 to 15 carbon atoms [p-phenylenediamine, 2,4- or 2,6-toluenediamine, 2,2-bis(4,4'-diaminophenyl)propane, etc.].

The dicarboxylic acid (Q1-4) includes dicarboxylic acids containing 4 to 20 carbon atoms, for example aliphatic dicarboxylic acids such as succinic acid, glutaric acid, adipic acid, pimelic acid, suberic acid, azelaic acid, sebacic acid, undecanedioic acid and dodecanedioic acid; aromatic dicarboxylic acids such as terephthalic acid, isophthalic acid, phthalic acid, naphthalene-2,6- or -2,7-dicarboxylic acid, diphenyl-4,4'-dicarboxylic acid, diphenoxyethanedicarboxylic acid and sulfonic acid alkaline metal salts (sodium salt, potassium salt, etc.) of 3-sulfoisophthalic acid; and alicyclic dicarboxylic acids such as 1,4-cyclohexanedicarboxylic acid and dicyclohexyl-4,4'-dicarboxylic acid. Ester-forming derivatives [lower alkyl (containing 1 to 6 carbon atoms) esters, anhydrides, etc.] of these may also be used.

Preferred as (Q1) are ring opening polymerization products derived from caprolactam, polycondensates of 12-aminododecanoic acid and amides from adipic acid and hexamethylenediamine, and particularly preferred are ring opening polymerization products derived from caprolactam.

(Q1) can be obtained, for example, by subjecting the above-mentioned amide-forming monomer to ring opening polymerization or polycondensation in the presence of a dicarboxylic acid (Q1-4) containing 4 to 20 carbon atoms, which is used as a molecular weight modifier.

Preferred as the molecular weight modifier (Q1-4) are aliphatic dicarboxylic acids, aromatic dicarboxylic acids and sulfonic acid alkaline metal salts of 3-sulfoisophthalic acid, and particularly preferred are adipic acid, sebacic acid, terephthalic acid, isophthalic acid and sulfonic acid sodium salt of 3-sulfoisophthalic acid.

The Mn of (Q1) is preferably not less than 200, in particular not less than 500, from the heat resistance viewpoint and, from the reactivity viewpoint, it is preferably not more than 5,000, in particular not more than 3,000.

As typical examples of (b2-1), there may be mentioned those described in Japanese Kokai Publication Hei-06-287547 and Japanese Kokoku Publication Hei-05-413, among others.

The polyetheramideimides (b2-2) are constituted of a polyamide imide (Q2) having at least one imide ring and a polyether diol (b1-1).

In (b2-2), Z in $E^3$ represented by the general formula (20) is a polyamide imide segment represented by the general formula (22).

Usable as (Q2) are polymers derived from a lactam (Q1-1) and a tribasic or tetrabasic aromatic polycarboxylic acid (Q2-1) capable of forming at least one imide ring; polymers derived from an aminocarboxylic acid (Q1-2) and (Q2-1); polymers derived from an amide (Q1-5) formed by a diamine (Q1-3) and a dicarboxylic acid (Q1-4) and (Q2-1); and mixtures of these.

(Q1-4) may also be used as a molecular weight modifier in the step of polymerization.

Usable as a constituent of (Q2) are tribsic or tetrabasic aromatic carboxylic acids capable of forming at least one imide ring upon reaction with an amino group or anhydrides of these carboxylic acids.

Among such aromatic carboxylic acids, there are monocyclic and polycyclic carboxylic acids containing 9 to 20 carbon atoms.

The tribasic carboxylic acids include, among others, 1,2, 4-trimellitic acid, 1,2,5-naphthalenetricarboxylic acid, 2,6, 7-naphthalenetricarboxylic acid, 3,3',4-diphenyltricarboxylic acid, benzophenone-3,3',4-tricarboxylic acid, diphenyl sulfone-3,3',4-tricarboxylic acid and diphenyl ether-3,3',4-tricarboxylic acid.

The tetrabasic carboxylic acids include, among others, pyromellitic acid, diphenyl-2,2',3,3'-tetracarboxylic acid, benzophenone-2,2',3,3'-tetracarboxylic acid, diphenyl sulfone-2,2',3,3'-tetracarboxylic acid and diphenyl ether-2, 2',3,3'-tetracarboxylic acid.

Typical examples of (b2-2) are lactams (Q1-1) (e.g. caprolactam) and, polyetheramideimides derived from an aromatic polycarboxylic acid (Q2) and a polyether diol (b1-1), as described in Japanese Kokoku Publication Hei-07-119342.

The polyetheresters (b2-3) are constituted of a polyester (Q3) and a polyether diol (b1-1).

In (b2-3), Z in $E^3$ represented by the general formula (20) is a polyester segment represented by the general formula (23) or (24).

Usable as (Q3) are polyesters (Q3-1) derived from a dicarboxylic acid (Q1-4) and (b0); polyesters (Q3-2) derived from a lactone or hydroxy carboxylic acid containing 6 to 12 carbon atoms; and mixtures of these. (Q1-4) may also be used as a molecular weight modifier in the step of polymerization.

The lactone includes lactones containing 6 to 12 carbon atoms, for example caprolactone, enantholactone, laurolactone and undecanolactone.

The hydroxy carboxylic acid includes hydroxy carboxylic acids containing 6 to 12 carbon atoms, for example ω-hydroxycaproic acid, ω-hydroxyenanthic acid, ω-hydroxycaprylic acid, ω-hydroxypelargonic acid, ω-hydroxycapric acid, 11-hydroxyundecanoic acid and 12-hydroxydodecanoic acid.

(b2-3) can be produced byreacting (b1-1) or (b1-2) with (Q1-4) or an ester-forming derivative thereof [e.g. lower alkyl (containing 1 to 6 carbon atoms) ester or anhydride], if necessary together with (b0) or (Q3-2) (polycondensation, transesterification or ring opening).

Typical examples of (b2-3) are polyetheresters described in Japanese Kokoku Publication Sho-58-19696, Japanese Kokoku Publication Sho-46-11480, Japanese Kokai Publication Sho-56-92919, Japanese Kokai Publication Sho-49-33948 and Japanese Kokoku Publication Sho-38-11298, among others.

The polyetheramides (b2-4) are constituted of a polyamide (Q1) and a polyether diamine (b1-2).

In (b2-4), Z in $E^3$ represented by the general formula (20) is a polyamide segment represented by the general formula (25).

The polyetherurethanes (b2-5) are constituted of an organic diisocyanate (OCN—$E^2$—NCO) and (b1-1) or (b1-2), if necessary together with a chain extender (H—D—$E^{11}$—D—H).

$E^2$, $E^{11}$ and D are respectively the same as $E^2$, $E^{11}$ and D in $E^{10}$ in the general formulas (26) and (27).

In (b2-5), Z in $E^3$ represented by the general formula (20) is a polyurethane (or polyurethane urea) segment represented by the general formula (26) or (27).

As the polyether group-containing hydrophilic polymer (b), in which Z is a constituent polyurethane segment represented by the general formula (26), there maybe mentioned polyetherurethanes derived from an organic diisocyanate (OCN—$E^2$—NCO) and a polyether diol (b1-1), if necessary together with a chain extender, for example those described in Japanese Kokoku Publication Sho-47-35300, Japanese Kokai Publication Sho-62-236854 and Japanese Kokoku Publication Hei-03-296565, among others.

As the polyether group-containing hydrophilic polymer (b), in which Z is a constituent polyurethane urea segment represented by the general formula (27), there may be mentioned products derived from an organic diisocyanate (OCN—$E^2$—NCO) and a polyether diol (b1-2), if necessary together with a chain extender.

Usable as the organic diisocyanate (OCN—$E^2$—NCO) are aromatic diisocyanates containing 6 to 20 carbon atoms (excluding the carbon atoms in the NCO groups; hereinafter the same shall apply), aliphatic diisocyanates containing 2 to 18 carbon atoms, alicyclic diisocyanates containing 4 to 15 carbon atoms, araliphatic diisocyanates containing 8 to 15 carbon atoms, modifications of these diisocyanates, and mixtures of two or more of them.

Typical examples of the above aromatic diisocyanates include 1,3- or 1,4-phenylene diisocyanate, 2,4- or 2,6-tolylene diisocyanate (TDI), crude TDI, 2,4'- or 4,4'-diphenylmethanediisocyanate (MDI), 4,4'-diisocyanatobiphenyl, 3,3'-dimethyl-4,4'-diisocyanatobiphenyl, 3,3'-diemthyl-4,4'-diisocyanatodiphenylmethane, 1,5-naphthylene diisocyanate and the like.

Typical examples of the above aliphatic diisocyanates include ethylene diisocyanate, tetramethylene diisocyanate, hexamethylene diisocyanate (HDI), dodecamethylene diisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, 2-isocyanatoethyl 2,6-diisocyanatohexanoate and the like.

Typical examples of the above alicyclic diisocyanates include isophoronediisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl) 4-cyclohexene-1,2-dicarboxylate, 2,5- or 2,6-norbornanediisocyanate and the like.

Typical examples of the above araliphatic diisocyanates include m- or p-xylylene diisocyanate (XDI), α,α,α',α'-tetramethylxylylene diisocyanate (TMXDI) and the like.

As the modifications of the above diisocyanates, there may be mentioned urethane modifications, urea modifications, carbodiimide modifications and urethodione modifications, among others.

Among them, TDI, MDI and HDI are preferred and HDI is particularly preferred.

For promoting the polyurethane formation reaction, a catalyst in general use may be used according to need.

As such catalyst, there may be mentioned metal-based catalysts, amine catalysts, and combinations of two or more of these.

As the metal-based catalysts, there may be mentioned, among others, tin catalysts (trimethyltin laurate, trimethyltin hydroxide, dimethyltin dilaurate, dibutyltin diacetate, dibutyltin dilaurate, stannous octoate, dibutyltin maleate, etc.); lead catalysts (lead oleate, lead 2-ethylhexanoate, lead naphthenate, lead octenoate, etc.); and other metal catalyst (cobalt naphthenate and other metal naphthenates, phenylmercury propionate, etc.).

As the amine catalysts, there may be mentioned, among others, triethylenediamine, tetramethylethylenediamine, tetramethylhexylenediamine, diazabicycloalkenes [e.g. 1,8-diazabicyclo[5.4.0]undecene-7 (DBU; registered trademark of SanApro)) etc.], dialkylaminoalkylamines (e.g. dimethylaminoethylamine, dimethylaminopropylamine, diethylaminopropylamine, dibutylaminoethylamine, dimethylaminooctylamine, dipropylaminopropylamine, etc.) and carbonates and organic acid salts (e.g. formate) of heterocyclic aminoalkylamines [e.g. 2-(1-aziridinyl)ethylamine, 4-(1-piperidinyl)-2-hexylamine, etc.]. In addition, mention may also be comprised of N-methylmorpholine, N-ethylmorpholine, triethylamine, diethylethanolamine and dimethylethanolamine.

The amount of these catalysts to be used is generally 0.0001 to 3%, preferably 0.001 to 2%, based on the total weight of reactants [total weight of organic diisocyanate (OCN—$E^2$—NCO) and (b1-1) or (b1-2), plus chain extender (H—D—$E^{11}$—D—H), if necessary].

The Mn of the polyether group-containing hydrophilic polymer (b2) is preferably not less than 800, in particular not less than 1,000, for the heat resistance viewpoint and, in consideration of the reactivity with (a4) to (a6), it is preferably not more than 50,000, in particular not more than 30,000.

From the moldability viewpoint, the content of the polyether segment (b1) in (b2) is preferably 30 to 80%, in particular 40 to 70%, based on the weight of (b2).

From the viewpoint of antistatic properties and of moldability, the content of the oxyethylene group in (b2) is preferably 30 to 80%, in particular preferably 40 to 70%, based on the weight of (b2).

Among the (b2) species, polyetheresteramides (b2-1) in which Z is a polyester amide segment represented by the general formula (21) are preferred from the viewpoint of antistatic properties and of heat resistance and, in particular, those in which $R^{12}$ and $R^{13}$ in the above general formula (19) are a hydrogen atom(s) and/or a group(s) represented by the formula —CO—NH—$E^2$—NCO are preferred.

In the next place, the cationic polymers (b3) are illustrated.

The polymers (b3) are hydrophilic polymers having, within the molecule, 2 to 80, preferably 3 to 60, cationic groups (c2) separated by a nonionic molecular chain (c1).

As (c2), there may be mentioned quaternary ammonium salt or phosphonium salt moiety-containing groups.

As the counter anion to the cationic groups (c2), there may be mentioned super strong acid anions and other anions.

The super strong acid anions include A) anions of super strong acids derived from the combination of a protic acid (d1) and a Lewis acid (d2) (e.g. tetrafluoroboric acid, hexafluorophosphoric acid, etc.) and B) anions of super strong acids such as trifluoromethanesulfonic acid.

The other anions include, among others, halogen ions (e.g. $F^-$, $Cl^-$, $Br^-$, $I^-$), $OH^-$, $PO_4^-$, $CH_3OSO_4^-$, $C_2H_5OSO_4^-$, $ClO_4^-$ and the like.

Typical examples of the protic acid (d1) for deriving super strong acids include hydrogen fluoride, hydrogen chloride, hydrogen bromide and hydrogen iodide, among others.

Typical examples of the Lewis acid (d2) include boron trifluoride, phosphorus pentafluoride, antimony pentafluoride, arsenic pentafluoride and thallium pentafluoride, among others.

While the combination of protic acid (d1) and Lewis acid (d2) is arbitrary, preferred examples of the super strong acid anions derived from such combination are $BF_4^-$, $PF_6^-$, $SbF_6^-$, $AsF_6^-$, $TlF_6^-$, $BF_3Cl^-$, $PF_5Cl^-$, $SbF_5Cl^-$, $AsF_5Cl^-$, $TlF_5Cl^-$, $BF_3Br^-$, $PF_5Br^-$, $SbF_5Br^-$, $AsF_5Br^-$, $TlF_5Br^-$, $BF_3I^-$, $PF_5I^-$, $SbF_5I^-$, $AsF_5I^-$ and $TlF_5I^-$, among others. Two or more of these may be used in combination.

Preferred among the counter anions from the heat resistance viewpoint are super strong acid anions, in particular super strong acid anions having a Hammett acidity function ($-H_0$) of 12 to 20.

More preferred are $BF_4^-$, $PF_6^-$, $BF_3Cl^-$ and $PF_5Cl^-$, and particularly preferred are $BF_4^-$ and $PF_6^-$.

As (c1), there maymentioned divalent organic groups such as divalent hydrocarbon groups or at least one divalent hydrocarbon group selected from the group consisting of hydrocarbon groups containing an ether, thioether, carbonyl, ester, imino, amide, imide, urethane, urea, carbonate and/or siloxy linkage and hydrocarbon groups having a heterocyclic ring structure containing a nitrogen or oxygen atom(s); and combinations of two or more of these.

As the divalent hydrocarbon groups, there may be mentioned straight or branched aliphatic hydrocarbon groups (e.g. alkylene groups, alkenylene groups, etc.) containing 1 to 18 (preferably 2 to 8) carbon atoms, for example ethylene, propylene, tetramethylene, hexamethylene, decamethylene, dodecamethylene and 2,2,4-trimethylhexamethylene; aromatic hydrocarbon groups containing 6 to 20 carbon atoms, for example 1,3- or 1,4-phenylene, 2,4- or 2,6-tolylene, 4,4'- or 2,4'-methylenebisphenylene, m- or p-xylylene, $\alpha,\alpha,\alpha',\alpha'$-tetramethylxylylene and naphthylene; and alicyclic hydrocarbon groups containing 4 to 15 carbon atoms, for example cyclohexylene, methylcyclohexylene, 4,4'-methylenebiscyclohexyene and 2,5- or 2,6-norbornylene.

As the divalent hydrocarbon groups containing an ether, thioether, carbonyl, ester, imino, amide, imide, urethane, urea, carbonate and/or siloxy linkage, there may be mentioned (poly)oxyalkylene groups, for example the residues of the above-mentioned polyether diols (b1-1) [e.g. —(O$A^1$)m—O—$E^1$—O—($A^1$O)m'— ($E^1$, $A^1$, m and m' being as defined above)] and monoether diol residues represented by the general formula —A'—O—$E^1$— ($E^1$ and $A^1$ being as defined above); polythioether residues corresponding to the above (oxygen atom(s) being replaced by sulfur atom(s)); polyester and/or polyamide residues, for example groups represented by the general formulas (28) to (31) given below; polyurethane and/or polyurea residues, for example groups represented by the general formula (32) given below; residues of polycarbonates (derived from the above-mentioned diols (b0) and phosgene); residues of polysiloxanes (polyorganosiloxanes, for example polydimethylsiloxane) and the like.

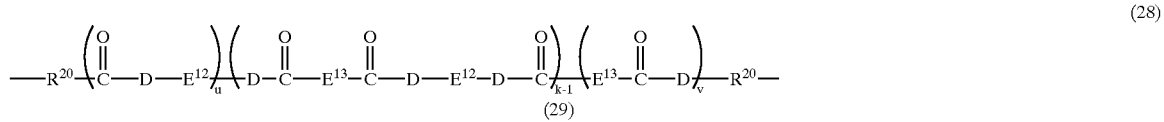

(28)

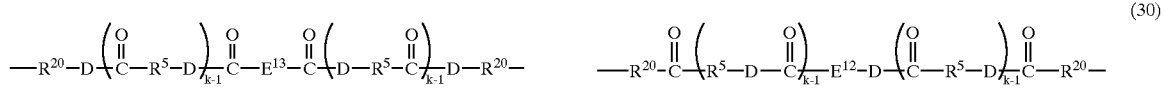

(29)

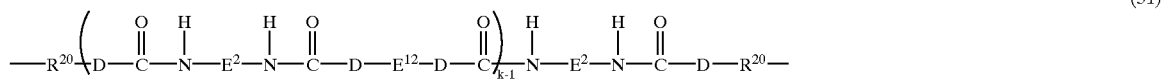

(30)

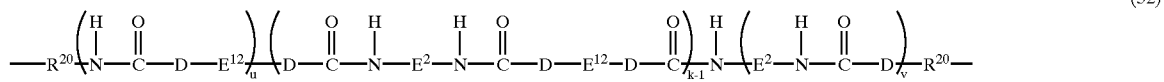

(31)

(32)

In the general formulas (28) to (32), D is an oxygen atom or an imino group, $R^5$ is a hydrocarbon group containing 1 to 11 carbon atoms, $R^{20}$ is a divalent organic group binding to a cationic group, $E^{12}$ is the residue of a diol (b0) (when D is an oxygen atom) or the residue of a diamine (Q1-3) (when D is an imino group), $E^3$ is the residue of a dicarboxylico acid (Q1-4), $E^2$ is an organic diisocyanate residue, u and v each is 0 or 1 and k is an integer of 1 to 20.

As $R^5$, there may be mentioned the residue of a lactam (when D is an imino group) and the residue of a lactone (when D is an oxygen atom). As the lactam, there may be mentioned those mentioned hereinabove referring to (Q1-1) and, as the lactone, there may be mentioned those lactones which correspond to the above lactams (e.g. caprolactone).

As $R^{20}$, there may be mentioned divalent hydrocarbon groups containing 2 to 12 carbon atoms, for example alkylene groups and the above-mentioned (poly)oxyalkylene groups [—$A^1$—O—E'—, —$(OA^1)$m—O—$E^1$—O—$(A^1O)$m'—].

As the diol residue in $E^{12}$, there may be mentioned the residues of the above-mentioned (b0), (b1-1) or a mixture of two or more of them after removal of the hydroxyl groups.

As the diamine residue included by $E^{12}$, there may be mentioned the residues of the above-mentioned (Q1-3), the above-mentioned polyether diamines (b1-2) or a mixture of two or more of them after removal of the amino groups.

As $E^{13}$, there maybe mentioned the residues of dicarboxylic acids (Q1-4) after removal of the carboxyl groups.

As $E^2$, there may be mentioned the residues of organic diisocyanates (e.g. the above-mentioned aromatic, aliphatic, alicyclic or araliphatic diisocyanates, modification thereof, and mixtures of two or more of these) after removal of the isocyanato groups.

The Mn of the nonionic molecular chains (c1) is generally 28 to 10,000, preferably 300 to 5,000. Among these nonionic molecular chains (c1), divalent hydrocarbon groups and ether linkage-containing divalent hydrocarbon groups are preferred, and alkylene groups containing 1 to 8 carbon atoms (e.g. hexamethylene group), phenylene groups and (poly)oxyalkylene groups, in particular (poly)oxyethylene and (poly)oxypropylene groups, are more preferred.

As (b3), there may be mentioned, for example, those having a repeating unit represented by the following general formula (33).

(33)

In the formula (33), M is a nitrogen or phosphorus atom, $J^-$ is a counter anion, d is an integer of 2 to 60, $L^1$ is a nonionic molecular chain (c1), and $R^{21}$ and $R^{22}$ each is a monovalent nonionic organic group.

Further, in (b3), the neighboring $R^{21}$ and/or $R^{22}$ groups in the above general formula (33) may be bound together to form a divalent nonionic organic group ($L^3$, $L^5$) and thus form a ring together with $M^+$ in the following general formula (34) or (35).

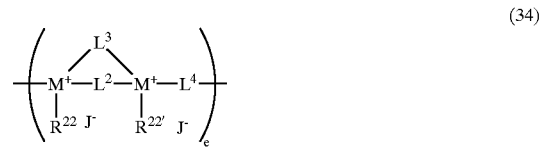

(34)

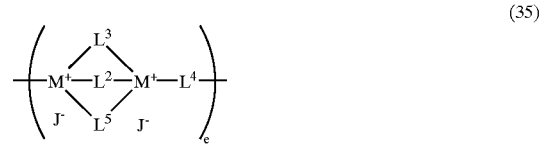

(35)

In the formulas (34) and (35), M is nitrogen or phosphorus atom, $L^2$, $L^3$, $L^4$ and $L^5$ each is a divalent nonionic molecular chain (c1), $R^{12}$ and $R^{22'}$ each is a monovalent nonionic organic group, $J^-$ is a counter anion and e is an integer of 1 to 30.

As $R^{21}$ and $R^{22}$ in the general formula (33) and $R^{22}$ and $R^{22'}$ in the general formula (34) or (35), there may be mentioned aliphatic, alicyclic or aromatic monovalent hydrocarbon groups (containing 1 to 20 carbon atoms), which may optionally have an ether or ester linkage.

As $R^{21}$, $R^{22}$ and $R^{22'}$, there may be mentioned, for example, alkyl groups (methyl, ethyl, octyl, dodecyl, etc.), alkenyl groups (allyl, 1-butenyl, oleyl, etc.), (substituted) aralkyl groups (benzyl, 4-methylbenzyl, etc.), alicyclic hydrocarbon groups (cyclohexyl etc.), alkoxy($C_1$ to $C_{12}$) alkyl ($C_1$ to $C_{20}$) groups (methoxyethyl, etc.), acyloxy($C_1$ to $C_{12}$)alkyl($C_1$ to $C_{20}$) groups (acetoxyethyl etc.) and the like.

The d is generally an integer of 2 to 60 and, from the viewpoint of antistatic properties and of the reactivity with the modified polyolefin (a1), it is preferably an integer of 3 to 50, in particular preferably 5 to 30.

The e is generally an integer of 1 to 30 and, from the viewpoint of antistatic properties and of the reactivity with the modified polyolefin (a1), it is preferably an integer of 2 to 25, in particular preferably 3 to 15.

As $L^1$ to $L^5$, there may be mentioned the above-mentioned nonionic molecular chains (c1).

Preferred examples of the cationic polymer (b3) are those having a repeating unit of the general formula (33) or (35).

More preferred examples are those in which, in the above general formula (33), $R^{21}$ and $R^{22}$ each is an alkyl group containing 1 to 8 carbon atoms, $L^1$ is a polyester residue (in particular preferably that of the general formula (29) in which $R^{20}$ is an alkylene group containing 2 to 4 carbon atoms, D is an oxygen atom and k is 1) and those in which, in the above general formula (35), $L^2$, $L^3$ and $L^5$ each is an alkylene group containing 2 to 8 carbon atoms and $L^4$ is an alkylene group containing 2 to 20 carbon atoms.

As typical examples of these, there may be mentioned those having a repeating unit represented by the following formula (36) or (37).

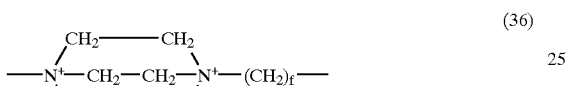

(36)

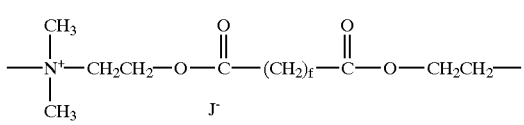

(37)

In the formulas (36) and (37), $J^-$ represents a counter anion and f represents an integer of 2 to 12.

Other examples of the cationic polymer (b3) include those having a repeating unit represented by the following general formula (38).

(38)

In the formula (38), $A^4$ is a trivalent hydrocarbon group and M, $J^-$, $R^{21}$, $R^{22}$, $R^{22'}$ and d are as defined above.

As the trivalent hydrocarbon group $A^4$, there may be mentioned trivalent aliphatic hydrocarbon groups containing 2 to 20 carbon atoms, for example groups represented by $-CH_2(CH_2)_gCH<$ (g being an integer of 0 or 1 to 18), and trivalent aromatic hydrocarbon groups containing 6 to 12 carbon atoms, for example a benzene ring having bonding sites at positions 1, 3, 5-, 1, 2, 4- or 1, 2, 3-.

As the cationic group (c2), there may be mentioned groups having a quaternary ammonium salt moiety or a phosphonium salt moiety. Among quaternary ammonium salt moiety-containing groups, quaternary ammonium salt moiety-containing divalent heterocyclic groups are preferred.

As the quaternary ammonium salt moiety-containing divalent heterocyclic groups, there may be mentioned groups structurally resulting from quaternization of tertiary amino group-containing divalent heterocyclic groups [e.g. divalent imidazole ring groups (1,4-imidazolene, 2-phenyl-1,4-imidazolene, etc.), divalentpiperidineringgroups (2,3-, 3,4- or 2,6-piperidylene), divalent aromatic heterocyclic groups (2,3-, 2,4-, 2,5-, 2,6-, 3,4- or 3,5-pyridylene, 2,5-pyrimidinylene, 3,6-pyridazinylene, 2,5-pyrazinylene, etc.)].

From the viewpoint of the reactivity with (a1) to (a3), it is desirable that the terminal structure of (b3) is a carbonyl, hydroxyl or amino group.

The Mn of (b3) is preferably 500 to 20,000, more preferably 1,000 to 15,000, in particular preferably 1,200 to 8,000, from the viewpoint of antistatic properties and of the reactivity with (a1) to (a3).

The method of producing (b3) is not particularly restricted but includes the following processes (1) to (5), among others.

(1) The process which comprises reacting a (secondary or tertiary) amino group-containing diol with a quaternizing agent (2 equivalents or 1 equivalent, respectively, per equivalent of the amino group), in necessary in the presence of a solvent and reacting the resulting quaternized diol or a mixture of the same and a diol (b0) and/or a diamine (Q1-3) with a dicarboxylic acid (Q1-4) [or an ester-forming derivative thereof (e.g. acid anhydride, lower alkyl ester or acid halide)]; hereinafter the same shall apply] in the manner of polyester formation or polyesteramide formation.

As the tertiary amino group-containing diol, there may be mentioned primary amine-alkylene oxide adducts [preferably N-alkyl($C_1$ to $C_8$)dialkanolamines, in particular preferably N-methyldiethanolamine, N-ethyldiethanolamine, N-methyldiisopropanolamine, etc.] and tertiary amino group-containing heterocyclic diols [e.g. 2-phenyl-4,5-bis(hydroxymethyl) imidazole and like imidazole derivatives].

As the secondary amino group-containing diol, there may be mentioned dialkanolamines containing 2 to 4 carbon atoms in each hydroxyalkyl group, for example diethanolamine, diisopropanolamine and di-n-propanolamine. As the quaternizing agent, there maybe mentioned, among others, alkyl halides containing 1 to 4 carbon atoms (e.g. bromomethane, chloromethane, iodomethane, bromoethane, chloroethane, etc.), dialkyl sulfates (containing 1 to 4 carbon atoms in each alkyl group) (e.g. dimethyl sulfate, diethyl sulfate, etc.) and dialkyl carbonates (each alkyl group containing 1 to 8 carbon atoms) (e.g. dimethyl carbonate, diethyl carbonate, dibutyl carbonate, etc.).

As the solvent, there may be mentioned alcohols such as methanol, ethanol, isopropanol, butanol.

As the ester-forming derivative, there may be mentioned lower ($C_1$ to $C_6$) alkyl esters, acid anhydrides and acid halides, among others. The quaternization is carried out generally at a temperature of 50 to 100° C.

As the method of introducing a super strong acid anion as a counter ion to the cationic group (c2), there may be mentioned, for example, the method which comprises dissolving the quaternized diol in a solvent (such as mentioned above) and adding an alkaline metal salt of a super strong acid anion (e.g. $NaBF_4$ or $NaPF_6$) to thereby effect the salt exchange reaction or comprises adding an acid corresponding to a super strong acid anion (e.g. $HBF_4$ or $HPF_6$) to thereby effect the anion exchange directly.

(2) The process which comprises reacting the above quaternized diol or a mixture of the same and another diol (b0) and/or a diamine (Q1-3) with more than one of the above-mentioned organic diisocyanates in one step or multistepwise for polyurethane (urea) formation.

(3) The process which comprises reacting a (primary, secondary or tertiary) amino group-containing dicarboxylic acid with a quaternizing agent (3 equivalents, 2 equivalents or 1 equivalent, respectively, per equivalent of the amino group) and then reacting the quaternization product or a mixture of the same and a dicarboxylic acid. (Q1-4)) with (b0) and/or (Q1-3) in the manner of polyester formation or polyesteramide formation.

As the amino group-containing dicarboxylic acid, there may be mentioned dicarboxylic acid represented by the general formulas:

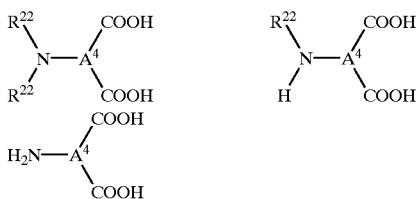

(in which the symbols are as defined above), for example 5-(N-dimethylamino)isophthalic acid, glutamic acid, aspartic acid, 5-aminoisophthalic acid, 3-aminophthalic acid, iminodiacetic acid and iminodibenzoic acid; nitrogen-containing heterocycle-dicarboxylic acids, for example imidazole-4,5-dicarboxylic acid, piperidinedicarboxylic acids and pyridinedicarboxylic acids; and N,N'-bis(2-carboxyalkyl) derivatives (each alkyl group containing 1 to 12 carbon atoms) of a diamino compound [e.g. the above-mentioned diamine (Q1-3), the reaction product from the above-mentioned diol (b0) and the above-mentioned lactam or amino carboxylic acid], for example N,N'-bis(2-carboxyethyl)-N,N'-ethylene-glycine.

(4) The process which comprises subjecting the above-mentioned tertiary amino group-containing diol or tertiary amino group-containing dicarboxylic acid, without preliminary quaternization, to polyester (amide) formation or polyurethane (urea) formation reaction to give a tertiary amino group-containing polymer and then quaternizing the tertiary amino groups with a quaternizing agent, if necessary in the presence of a solvent.

(5) The process which comprises reacting a heterocyclic diamine having two tertiary amino groups, a dihalide and a monohalide for terminally introducing a functional group together, if necessary in the presence of a solvent, at 50 to 100° C. to thereby effect the quaternization and polymerization reaction simultaneously.

As the heterocyclic diamine having two tertiary amino groups, there may be mentioned monocyclic or polycyclic diamines containing 6 to 30 carbon atoms, for example N,N'-di ($C_1$ to $C_{12}$)alkylpiperazines (e.g. N,N'-dimethylpiperazine), triethylenediamine and C-($C_1$ to $C_4$) alkyl-substituted derivatives thereof, cycloamidines [those described in U.S. Pat. No. 4,524,104, 1,8-diazabicyclo [5.4.0]undecene-7, etc.].

Usable as the dihalide are alkylene dihalides containing 2 to 15 carbon atoms, for example 1,2-dibromoethane, 1-bromo-2-chloroethane, 1,2-diiodoethane, 1-bromo-3-chloropropane, 1,3-dibromopropane, 1,3-dichloropropane, 1,3-diiodopropane, 1-bromo-4-chlorobutane, 1,4-dibromobutane, 1,4-dichlorobutane, 1,4-diiodobutane, 1-bromo-5-chloropentane, 1,5-dibromopentane, 1,5-dichloropentane, 1,5-diiodopentane, 1-bromo-6-chlorohexane, 1,6-dibromohexane, 1,6-dichlorohexane, 1,6-diiodohexane, 1,7-dibromoheptane, 1,7-dichloroheptane, 1,7-diiodoheptane, 1,8-dibromooctane, 1,8-dichlorooctane, 1,8-diiodooctane, 1,9-dibromononane, 1,9-dichlorononane, 1,9-diuodononane, 1,10-dibromodecane, 1,10-dichlorodecane, 1,10-diiododecane, 1,11-dibromoundecane and 1,12-dibromododecane.

Usable as the monohalide are monohalogen compounds having a functional group (e.g. hydroxyl, carboxyl or epoxy), for example monohalogenated alcohols containing 2 to 12 carbon atoms (2-chloroethanol, 3-chloro-1-propanol, 3-bromo-1-propanol, 6-chloro-1-hexanol, 6-bromo-1-hexanol, 4-chloro-1-butanol, 3-chloro-2,2-dimethyl-1-propanol, etc.); monohalogenated carboxylic acids containing 2 to 12 carbon atoms (monochloroacetic acid, 2-chloropropanoic acid, etc.), and epihalohydrins (epichlorohydrin etc.).

There is a further process which comprises reacting the above-mentioned (a1) to (a3) with the polymer mentioned above under (4) before quaternization to give a tertiary amino group-containing block polymer and then carrying out the quaternization of the tertiary amino groups and anion exchange.

Among the processes (1) to (5) mentioned above, (4) and (5) are preferred.

The anionic polymers (b4) are now described.

The polymers (b4) are anionic polymers comprising a sulfonyl group-containing dicarboxylic acid (e1) and a diol (b0) or polyether (b1) as an essential constituent and having 2 to 80, preferably 3 to 60, sulfonyl groups within the molecule.

Usable as (e1) are sulfonyl group-containing aromatic dicarboxylic acids, sulfonyl group-containing aliphatic dicarboxylic acids, and salts thereof in which the sulfonyl group alone is in a salt form.

As the sulfonyl group-containing aromatic dicarboxylic acids, there may be mentioned, among others, 5-sulfoisophthalic acid, 2-sulfoisophthalic acid, 4-sulfoisophthalic acid, 4-sulfo-2,6-naphthalenedicarboxylic acid and ester-forming derivatives of these [lower ($C_1$ to $C_4$) alkylesters (methylester, ethyl ester, etc.), acid anhydrides, etc.].

As the sulfonyl group-containing aliphatic dicarboxylic acids, there may be mentioned, among others sulfosuccinic acid and ester-forming derivatives thereof [lower ($C_1$ to $C_4$) alkyl esters (methyl ester, ethyl ester, etc.), acid anhydride, etc.].

As the salts of these in which the sulfonyl group alone is in a salt form, there may be mentioned alkaline metal salts such as lithium salt, sodium salt and potassium salt, alkaline earth metal salts such as magnesium salt and calcium salt, ammonium salt, amine salts such as hydroxyalkyl ($C_2$ to $C_4$) group-containing mono-, di- or tri-amines (mono-, di- or tri-ethylamine salts, mono-, di- or tri-ethanolamine or diethylethanolamine salts and like organic amine salts), quaternary ammonium salts derived from these amines, and combinations of two or more of these.

Among these, sulfonyl group-containing aromatic dicarboxylic acids are preferred, 5-sulfoisophthalic acid salts are more preferred, and 5-sulfoisophthalic acid sodium salt and 5-sulfoisophthalic acid potassium salt are particularly preferred.

Preferred among the (b0) or (b1) species constituting (b4) are alkanediols containing 2 to 10 carbon atoms, ethylene glycol, polyethylene glycol (degree of polymerization 2 to 20), ethylene oxide adducts derived from bisphenols (bisphenol A etc.) (number of moles of ethylene oxide added 2 to 60), and mixtures of two or more of them.

For producing (b4), the conventional methods of producing polyesters can be applied without any particular modification.

The polyesterification reaction is generally carried out under reduced pressure at a temperature within the range of 150 to 240° C. and the reaction time is 0.5 to 20 hours.

In the above esterification reaction, if necessary, any of those catalysts which are generally used in ordinary esterification reactions may be used.

As the esterification catalyst, there may be mentioned, among others, antimony-based catalysts such as antimony trioxide; tin-based catalysts such as monobutyltin oxide and dibutyltin oxide; titanium-based catalysts such as tetrabutyl titanate; zirconium-based catalysts such as tetrabutyl zirconate; and metal acetate catalysts such as zinc acetate.

From the viewpoint of antistatic properties and of the reactivity with (a1) to (a3), the Mn of (b4) is preferably 500 to 20,000, more preferably 1,000 to 15,000, in particular preferably 1,200 to 8,000.

From the viewpoint of antistatic properties and of the reactivity with (a1) to (a3), it is desirable that said (b4) generally have 2 to 80, in particular 3 to 60, sulfonyl groups within the molecule.

From the antistatic property viewpoint, the Mn of the block polymer (A) of the present invention as determined by gel permeation chromatography is preferably 2,000 to 60,000, more preferably 5,000 to 40,000, in particular preferably 8,000 to 30,000.

A block polymer (A1) according to a first embodiment of the present invention which has a structure such that the block (a1) and the block (b1) are bonded together alternately and repeatedly is now described.

As (A1), there may be mentioned polymers having a repeating unit represented by the following general formula (1).

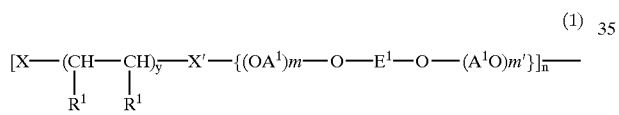

In the general formula (1), n is an integer of 2 to 50, one of $R^1$ and $R^2$ is a hydrogen atom and the other is a hydrogen atom or an alkyl group containing 1 to 10 carbon atoms, y is an integer of 15 to 800, $E^1$ is the residue of a diol (b0) after removal of the hydroxyl groups, $A^1$ is an alkylene group containing 2 to 4 carbon atoms, m and m' each represents an integer of 1 to 300, X is a group selected from among the groups represented by the following general formulas (2) to (8) and X' is a group selected from among the groups represented by the corresponding general formulas (2') to (8'), namely when X is a group represented by the general formula (2), X' is a group represented by the general formula (2'), the relationship between general formulas (3) to (8) and general formulas (3') to (8') being the same.

X

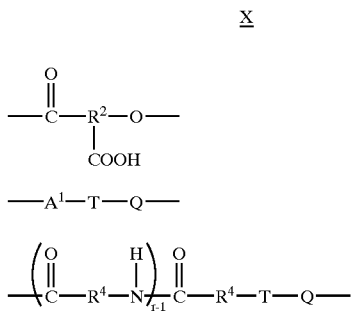

-continued

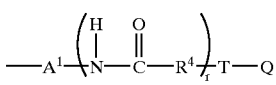

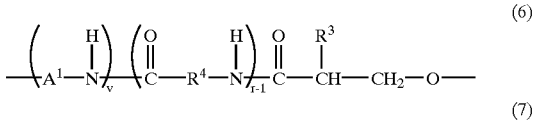

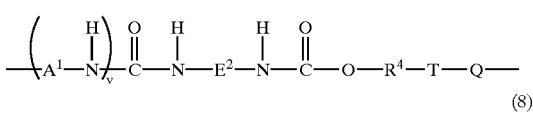

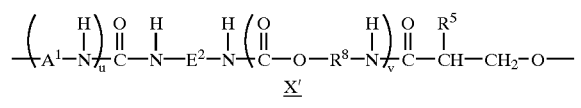

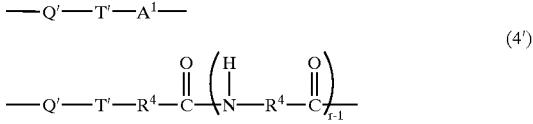

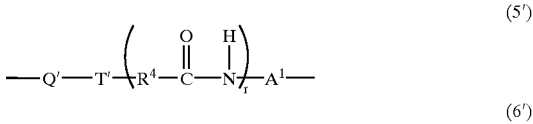

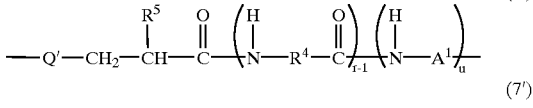

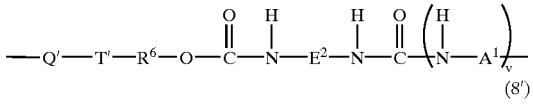

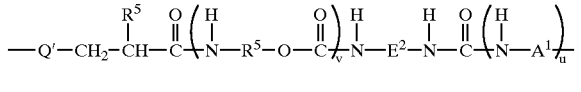

In the general formulas (2) to (8) and (2') to (8'), $R^3$ and $R^{3'}$ each represents a trivalent hydrocarbon group containing 2 or 3 carbon atoms, $R^4$ represents a divalent hydrocarbon group containing 1 to 11 carbon atoms, $R^5$ represents a hydrogen atom or an alkyl group containing 1 to 10 carbon atoms, $R^6$ represents a hydrocarbon group containing 2 to 22 carbon atoms, $E^2$ represents an organic diisocyanate residue, r is 1 to 10 and u and v each is 0 or 1.

Q, Q', T and T' are groups represented by the following formulas, respectively.

Q:

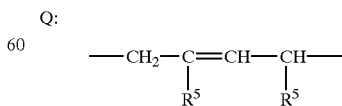

Q':

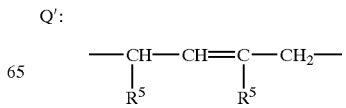

T:

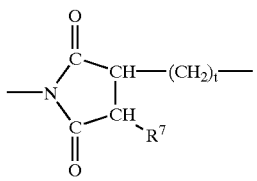

T':

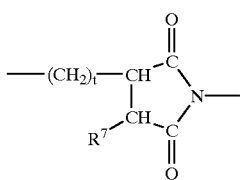

$R^5$ is a hydrogen atom or an alkyl group containing 1 to 10 carbon atoms, $R^7$ is a hydrogen atom or a methyl group and t is 0 when $R^7$ is a methyl group or 1 when it is a hydrogen atom.

The polyether segment $\{(OA^1)m—O—E'—O—(A^1O)m'\}$ in the brackets { } in the repeating unit represented by the general formula (1) is constituted of the polyether portion of the above-mentioned polyether (b1) and, in the formula, $E^1$, $A^1$, m and m' are as defined above.

$E^1$ in the general formula (1) is preferably the residue of an aliphatic dihydric alcohol, a dihydric phenol or a tertiary amino group-containing diol after removal of the hydroxyl groups.

The block polymer (A1) in which, in the general formula (1), X is a group represented by the general formula (2) and X' is a group represented by the general formula (2') can be obtained by reacting said carbonyl group-containing polyolefin (a1-1) directly with a polyether diol (b1-1).

In the general formulas (2) and (2'), $R^3$ and $R^{3'}$ are groups derived from unsaturated dicarboxylic acids and represented by the formulas:

$R^3$:

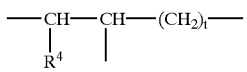

$R^{3'}$:

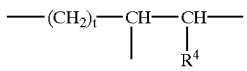

(in which $R^4$ is a hydrogen atom or a methyl group and t is 1 when $R^4$ is a hydrogen atom or 0 when $R^4$ is a methyl group). When maleic acid or fumaric acid is used for the carbonyl modification of the polyolefin, $R^3$ is —$CH_2$—CH< and $R^{3'}$ is >CH—$CH_2$—.

The method of producing (A) is not particularly restricted but (A1) can be produced by the method which comprises adding (b1-1) to (a1-1) and carrying out the polymerization (polycondensation) reaction generally at 200 to 250° C. under reduced pressure.

In the above polymerization reaction, any of the known catalysts can generally be used.

As the catalyst, there may be mentioned antimony catalysts such as antimony trioxide; tin catalysts such as monobutyltin oxide; titanium catalysts such as tetrabutyl titanate; zirconium catalysts such as tetrabutyl zirconate; organic acid zirconium salts such as zirconium acetate, zinc acetate; and like organic acid metal salts; as well as combinations of two or more of these.

Among them, zirconium catalysts and acetic acid metal salt catalysts are preferred and zirconium acetate is particularly preferred.

The amount of catalyst to be used is generally 0.001 to 5% based on the total weight of (a1-1) and (b1-1).

The block polymer (A1) in which, in the general formula (1), X is a group represented by the general formula (3) and X' is a group represented by the general formula (3') can be obtained by reacting (a1-1) directly with (b1-2). The polymerization reaction of (a1-1) and (b1-2) can be carried out in the same manner as the polymerization reaction of (a1-1) and (b1-1).

The block polymer (A1) in which, in the general formula (1), X is a group represented by the general formula (4) and X' is a group represented by the general formula (4') can be obtained by reacting (a1-2) directly with (b1-1).

The polymerization reaction of (a1-2) and (b1-1) can be carried out in the same manner as the polymerization reaction of (a1-1) and (b1-1)

The block polymer (A1) in which, in the general formula (1) X is a group represented by the general formula (5) and X' is a group represented by the general formula (5') can be obtained by reacting (a1-2) directly with (b1-2).

It may also be produced by secondarily modifying (b1-2) with said lactam or amino carboxylic acid and reacting this with (a1-1).

These polymerization reactions can be carried out in the same manner as the polymerization reaction of (a1-1) and (b1-1)

The block polymer (A1) in which, in the general formula (1), X is a group represented by the general formula (6) and X' is a group represented by the general formula (6') can be obtained by reacting (a1-3) (when r=1) or (a1-4) (when r≧2) with (b1-1) (when u=0) or a polyether diamine (b1-2) (when u=1).

The polymerization reaction of (a1-3) or (a1-4) and (b1-1) or (b1-2) can be carried out in the same manner as the polymerization reaction of (a1-1) and (b1-1).

The block polymer (A1) in which, in the general formula (1), X is a group represented by the general formula (7) and X' is a group represented by the general formula (7') is a product resulting from binding (a2-1) with (b1-1) (when u=0) or (b1-2) (when u=1) via an organic diisocyanate and can be obtained by reacting these simultaneously or successively.

In the case of successive reactions, the desired polymer can be obtained, for example, by reacting (a2-1) with an organic diisocyanate to obtain an isocyanate-modified polyolefin and then reacting this with (b1-1) or (b1-2).

The block polymer (A1) in which, in the general formula (1), X is a group represented by the general formula (8) and X' is a group represented by the general formula (8') is a product resulting from binding (a1-3) (when v=0) or (a2-2) (when v=1) with (b1-1) or (b1-2) via an organic diisocyanate and can be obtained by reacting these simultaneously or successively.

In the case of successive reactions, the desired polymer can be obtained, for example, by reacting (a1-3) or (a2-2) with an organic diisocyanate to obtain an isocyanate-modified polyolefin and then reacting this with (b1-1) or (b1-2).

The reaction of (a2-1) or (a2-2) with the organic diisocyanate, the reaction of (b1-1) or (b1-2) with the organic diisocyanate, and the reaction of the isocyanate-modified polyolefin with (b1-1) or (b1-2) can be carried out in the same manner as the ordinary urethane or urea formation reaction.

In the step of isocyanate-modified polyolefin preparation, the equivalent ratio (NCO/OH ratio) between organic diisocyanate and (a2-1) or (a2-2) or the equivalent ratio (NCO/OH ratio) between isocyanate-modified polyolefin with (b1-1) or (b1-2) is generally 1.8/1 to 3/1, preferably 2/1.

Usable as the organic diisocyanates and the reaction-promoting catalysts are those as mentioned above referring to (b2-5).

Among the block polymers (A1) having a repeating unit represented by the general formula (1), those in which X is a group represented by the general formula (2) or (4) are preferred and those in which X is a group represented by the general formula (4) are particularly preferred.

The amount of the polyether (b1) constituting the block polymer (A1) is generally 20 to 90%, preferably 25 to 90%, in particular preferably 30 to 70%, based on the total weight of (a1) and (b1). A proportion (b1) within this range is more preferred from the antistatic property viewpoint.

The Mn of said (A1) is generally 2,000 to 60,000, preferably 5,000 to 40,000, in particular preferably 8,000 to 30,000. When the Mn is in this range, the polymer is excellent in particular in antistatic performance.

Referring to the structure of the block polymer (A1), the mean number (Nn) of repetitions of the repeating unit composed of the block of polyolefin (a) and the block of hydrophilic polymer (b) is generally 2 to 50, preferably 2.3 to 30, more preferably 2.7 to 20, in particular preferably 3 to 10.

The Nn in this range is preferred from the antistatic property viewpoint.

The Nn can be determined from the Mn of (A) and the results of $^1$H NMR analysis.

In the case of (A) having a structure such that the block of (a1-1) and the block of (b1-1) are bonded together alternately and repeatedly, for instance, a signal at 4.0 to 4.1 ppm ascribable to the protons in the ester linkage [—C(C=O)—OCH$_2$—] and a signal at 3.2 to 3.7 ppm ascribable to the protons in polyethylene glycol can be observed in $^1$H NMR analysis.

By obtaining the ratio between the intergrated values for these protons, Nn can be determined from the Mn and this ratio.

In cases that the polymer is composed of the block of another (a) and the block of another (b), the Nn can be determined in the same manner.

Both termini of (A1) has any terminal group selected from among (b1)-derived hydroxyl, amino, isocyanato and epoxy groups, polyolefin (a1)-derived carbonyl, amino, hydroxyl, isocyanato, alkyl and alkenyl groups and an organic diisocyanate-derived isocyanato group.

In the next place, a block polymer (A2) according to a second embodiment of the present invention is described.

(A2) is a block polymer in which the block of polyolefin (a) and the block of hydrophilic polymer (b) are bonded together in the manner of (a)-(b) or (a)-(b)-(a).

(A2) can be obtained by reacting (b2) with a polyolefin (a4) represented by any of the following general formulas (9) to (11) and thus having a carbonyl group at one polymer terminus.

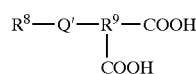
(9)

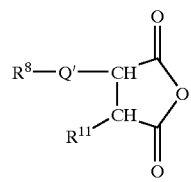
(10)

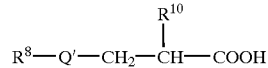
(11)

In the above formulas, R$^8$ is a polyolefin residue, Q' is a group represented by —CH(R$^{10}$)—CH=C(R$^{10}$)—CH$_2$—, R$^9$ is a trivalent hydrocarbon group containing 2 or 3 carbon atoms, R$^{10}$ is a hydrogen atom or an alkyl group containing 1 to 10 carbon atoms and R$^{11}$ is a hydrogen atom or a methyl group.

Preferred as (b2) are those represented by the above general formula (19).

In the general formula (19), E$^3$ is preferably a group represented by the above general formula (20).

In the above general formula (20), Z is preferably a segment represented by one of the above general formulas (21) to (27).

As the (A2), there may be mentioned those having a structure such that one or both of the termini of (b2) have been replaced by a group represented by one of the following general formulas (12) to (14) [when (b2) is terminated in hydroxyl or epoxy] (bound via ester bonding); those having a structure such that one or both of the termini of (b2) have been replaced by a group represented by one of the following general formulas (15) to (17) [when (b2) is terminated in amino or isocyanato] (bound via amide bonding); and those having a structure such that one or both of the termini of (b2) have been replaced by a group represented by the following general formula (18) [when (b2) is terminated in amino] (bound via imide bonding).

(12)

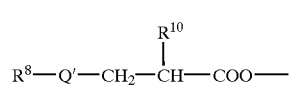
(13)

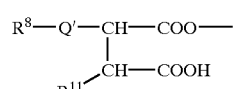
(14)

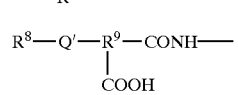
(15)

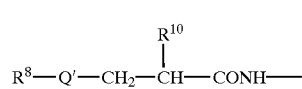
(16)

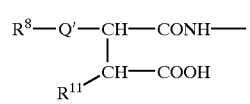
(17)

-continued

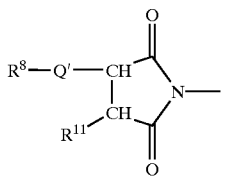
(18)

In the above formulas, the symbols are as defined referring to the formulas (9) to (11).

Preferred are those cases in which the polyolefin residue $R^8$ is a group represented by the formula $R^{17}$—[CH($R^{18}$)—CH($R^{19}$)]y— (in which $R^{17}$ represents a hydrogen atom or a group represented by $CH_2$=CH—, one of $R^{18}$ and $R^{19}$ represents a hydrogen atom and the other represents a hydrogen atom or an alkyl group containing 1 to 10 carbon atoms, and y represents an integer of 15 to 800), $R^{12}$ and $R^{13}$ are a hydrogen atom(s) and/or a group(s) represented by the formula: —CO—NH—$E^2$—NCO and Z is a polyester amide segment represented by the general formula (21).

As for the production of the block polymer (A2), there may be mentioned, among others, the method which comprises reacting (a4) to (a6) with (b2) and the method which comprises reacting precursors (reactants) of (b2) in the presence of (a4), for instance, in the process of producing (b2) to thereby effect the formation of the block of polymer (b2) and the formation of block polymer (A2) simultaneously.

In cases that (b2) is a polyetheresteramide (b2-1), the production method therefor is not particularly restricted but includes, the processes mentioned below.

Those block polymers (A2) in which (b2) is a polymer segment other than polyetheresteramide (b2-1) can be produced in the same manner.

Process 1: The process which comprises carrying out the polymerization reaction of (a4-1) represented by the general formula (9) and polyetheresteramide (b2-1) at 200 to 250° C. under reduced pressure.

Process 2: The process which comprises carrying out the polymerization reaction of (a4-1), (Q1) and (b1-1) at 200 to 250° C. under reduced pressure.

Process 3: The process which comprises reacting (a4-1), more than one of (Q1-1) to (Q1-3), and (Q1-4) together in the presence or absence of water at 180 to 250° C. under reduced pressure to thereby cause formation of (Q1) in (a4-1), then adding (b1-1) thereto and carrying out the polymerization reaction at 200 to 250° C. under reduced pressure.

Process 4: The process which comprises reacting (a4-1), more than one of (Q1-1) to (Q1-3), (Q1-4) and (b1-1) together in the presence or absence of water at 180 to 250° C. under reduced pressure to thereby cause formation of (Q1) in (a4-1) and then carrying out the polymerization reaction at 200 to 250° C. under reduced pressure.

In the above polymerization reactions, any of the known catalysts can generally be used.

As the catalyst, there may be mentioned those mentioned above, namely antimony-based catalysts such as antimony trioxide; tin-based catalysts such as monobutyltin oxide; titanium-based catalysts such as tetrabutyl titanate; zirconium-based catalysts such as tetrabutyl zirconate; organic acid zirconium salts such as zirconium acetate; zinc acetate; and like organic acid metal salts; as well as combinations of two or more of these.

Among them, zirconium-based catalysts and organic acid metal salt catalysts are preferred and zirconium acetate is particularly preferred.

The amount of catalyst to be used is generally 0.0001 to 5%, preferably 0.001 to 2%, based on the total weight of the reactants to be reacted [e.g. (a4-1) and (b2-1) in Process 1].

More specifically, as (A2), the block polymer of the bonding type (a)-(b) or (a)-(b)-(a) can be produced by reacting (a4) with a polyether-containing hydrophilic polymer (b2) in which, in the above general formula (19), p is 0 and $R^{12}$ and $R^{13}$ each is a hydrogen atom in the same manner as in the above-mentioned polymerization reactions.

A block polymer of the bonding type (a)-(b) or (a)-(b)-(a) can also be produced by reacting a modified polyolefin prepared by reacting (a5) with an organic diisocyanate compound with a polyether group-containing hydrophilic polymer (b2) in which, in the above general formula (19), p is b and $R^{12}$ and $R^{13}$ each is a hydrogen atom.

The proportion of the polyether (b2) constituting the block polymer (A2) is generally 20 to 80% by weight based on the weight of (A2) and, from the viewpoint of antistatic properties and of the compatibility with thermoplastic resins, which is to be mentioned later herein, it is preferably 30 to 70% by weight.

The Mn of said (A2) is generally 2,000 to 60,000, preferably 5,000 to 40,000.

Referring to the structure of the block polymer (A2), the mean number (Nn) of repetitions of the repeating unit composed of the block of polyolefin (a) and the block of hydrophilic polymer (b) is generally 0.4 to 2.1, preferably 0.5 to 2.0, more preferably 0.6 to 1.9, in particular preferably 0.7 to 1.8.

The Nn in this range is preferred from the antistatic property viewpoint.

The Nn can be determined from the Mn of (A2) and the results of $^1$H NMR analysis thereof in the same manner as in the case of (A1).

A block polymer (A3) according to a third embodiment of the present invention is now described.

The (A3) contains, as the hydrophilic polymer (b), the block of a cationic polymer (b3) having, within the molecule, 2 to 80, preferably 3 to 60, cationic groups (c2) separated by a nonionic molecular chain (c1) and has a structure such that (a) and (b3) are bound together alternately and repeatedly.

The (A3) can be obtained by the polymerization reaction of (b3) and (a1) to (a3) and can be produced in the same manner as the above-mentioned polymerization reaction of (a1-1) with (b1-1) or (b1-2).

If necessary, (b2) and (b1-1) or (b1-2) may be used in combination in an arbitrary ratio (e.g. 1:9 to 9:1 by weight).

The Mn of (A3) is generally 2,000 to 60,000, preferably 5,000 to 40,000, in particular preferably 8,000 to 30,000.

When the Mn is in this range, the block polymer is excellent in antistatic properties.

The cationic group (c2) content in (A3) is 2 to 500, preferably 10 to 300, in particular preferably 15 to 250 groups per molecule of (A3).

This range is preferred from the antistatic property viewpoint.

The Mn of (A3) per cationic group (c2) is generally 120 to 30,000, preferably 200 to 6,000, in particular preferably 300 to 4,000.

Referring to the structure of the block polymer (A3), the mean number (Nn) of repetitions of the repeating unit composed of the block of polyolefin (a) and the block of hydrophilic polymer (b) is generally 2 to 50, preferably 2.3 to 30, more preferably 2.7 to 20, in particular preferably 3 to 10.

The Nn in this range is preferred from the antistatic property viewpoint.

The Nn can be determined from the Mn of (A3) and $^1$H NMR analysis thereof in the same manner as in the case of (A1).

A block polymer (A4) according to a fourth embodiment of the present invention is now described.

The (A4) contains, as (b), the block of an anionic polymer (b4) composed of a sulfonyl group-containing dicarboxylic acid (e1) and a diol (b0) or a polyether (b1) as an essential constituent unit and having, within the molecule, 2 to 80, preferably 3 to 60, sulfonyl groups and has a structure such that (a) and (b4) are bound together alternately and repeatedly.

The (A4) can be obtained by the polymerization reaction of (b4) and (a1) to (a3) and can be produced in the same manner as the above-mentioned polymerization reaction of (a1) with (b1-1).

If necessary, (b4) and (b1-1) may be used in combination in an arbitrary ratio (e.g. 1:9 to 9:1 by weight).

The Mn of (A4) is generally 2,000 to 60,000, preferably 5,000 to 40,000, in particular preferably 8,000 to 30,000.

When the Mn is in this range, the block polymer is excellent in antistatic properties.

The sulfonyl group content in (A4) is 2 to 500, preferably 10 to 300, in particular preferably 15 to 250 groups per molecule of (A4).

This range is preferred from the antistatic property viewpoint.

The Mn of (A4) per sulfonyl group is generally 120 to 30,000, preferably 200 to 6,000, in particular preferably 300 to 4,000.

Referring to the structure of the block polymer (A4), the mean number (Nn) of repetitions of the repeating unit composed of the block of polyolefin (a) and the block of hydrophilic polymer (b) is generally 2 to 50, preferably 2.3 to 30, more preferably 2.7 to 20, in particular preferably 3 to 10.

The Nn in this range is preferred from the antistatic property viewpoint.

The Nn can be determined from the Mn of (A4) and $^1$H NMR analysis thereof in the same manner as in the case of (A1).

In the antistatic agent comprising (A) of the present invention, the above (A1), (A2), (A3) and (A4) can be used each singly but they may be used in combination in arbitrary proportions.

The antistatic agent of the invention which comprises (A), when incorporated in a thermoplastic resin (B), can provide said resin with antistatic properties.

The antistatic resin composition comprising (A) of the invention and a thermoplastic resin (B) also constitutes an aspect of the present invention.

As the thermoplastic resin (B), there may be mentioned, among others, vinyl resins (polyolefin resins (B1), polystyrene resins (B2), acrylic resins (B3), rubber-like (co)polymers (B4), etc.), polyamide resins (B5), polyester resins (B6), polyacetal resins (B7), polycarbonate resins (B8), thermoplastic polyurethane resins (B9), fluorocarbonresins (B10) and mixtures of two or more of these.

Usable as the vinyl resins are resins obtained by (co)polymerizing such vinyl monomer(s) mentioned below by the conventional method of polymerization (e.g. radical polymerization, Ziegler catalyst polymerization or methallocene-catalyzed polymerization).

As the vinyl monomer, there may be mentioned aliphatic hydrocarbon vinyl monomers, aromatic vinyl monomers, acrylic monomers, other unsaturated mono- or dicarboxylic acids and derivatives thereof, carboxylic esters of unsaturated alcohols, alkyl ethers of unsaturated alcohols, halogen-containing vinyl monomers, and combinations of two or more of these (random and/or block), among others.

As the aliphatic hydrocarbon vinyl monomers, there may be mentioned, among others, olefins such as ethylene, propylene and α-olefins containing 4 to 30 carbon atoms (1-butene, 4-methyl-1-pentene, 1-pentene, 1-octene, 1-decene, 1-dodecene, etc.) and dienes containing 4 to 30 carbon atoms (alkadienes such as butadiene and isoprene, and cycloalkadienes such as cyclopentadiene).

As the aromatic vinyl monomers, there may be mentioned, among others, styrene and homologs thereof, for example o-, m- or p-alkyl($C_1$–$C_{10}$)styrenes (e.g. vinyltoluene etc.), α-alkyl($C_1$–$C_{10}$)styrenes (e.g. α-methylstyrene etc.) and halogenated styrenes (e.g. chlorostyrene etc.) and the like (hereinafter collectively referred to as styrenes).

As the acrylic monomers, there may be mentioned, among others, (meth)acrylic acid and derivatives thereof.

The (meth)acrylic acid derivatives include, among others, alkyl($C_1$–$C_{20}$) (meth)acrylates [e.g. methyl (meth)acrylate, ethyl (meth)acrylate, butyl (meth)acrylate, etc.], mono- or di-alkyl($C_1$–$C_4$)aminoalkyl($C_2$–$C_4$) (meth)acrylates [e.g. aminoethyl (meth)acrylate, dimethylaminoethyl (meth)acrylate, etc.], (meth)acrylonitrile and (meth)acrylamide.

As the other unsaturated mono- or di-carboxylic acids, there may be mentioned, among others, crotonic acid, maleic acid, fumaric acid and itaconic acid and the derivatives thereof include, among others, mono- or di-alkyl ($C_1$–$C_{20}$) esters, acid anhydrides (maleic anhydride etc.) and imides (maleimide etc.).

As the unsaturated alcohol carboxylic esters, there may be mentioned carboxylic acid ($C_2$–$C_4$) esters of vinyl alcohol, (meth)allyl alcohol or the like (e.g. vinyl acetate), and the alkyl ethers of unsaturated alcohol include alkyl ($C_1$–$C_{20}$) ethers of vinyl alcohol, (meth)allyl alcohol or the like.

The halogen-containing vinyl monomers include, among others, vinyl chloride, vinylidene chloride and chloroprene.

As the polyolefin resins (B1), there may be mentioned (co)polymers of more than one of said olefinmonomers (ethylene, propylene, α-olefins containing 4 to 30 carbon atoms, etc.) as well as copolymers of more than one of the above olefin monomers and more than one copolymerizable vinyl monomer (weight ratio: generally 5/95 to 95/5, preferably 50/50 to 90/10).

As the copolymerizable vinyl monomer, there may be mentioned the above-mentioned monomers other than olefins, for example vinyl esters, acrylic monomers [alkyl ($C_1$–$C_{20}$) (meth)acrylates, acrylonitrile, etc.] and aromatic vinyl monomers (styrenes etc.).

Typical examples of (B1) are polypropylene, polyethylene, propylene-ethylene copolymers, copolymers (random or block) of propylene and/or ethylene and at least one other α-olefin, ethylene-vinyl acetate copolymer resins (EVA), ethylene-ethyl acrylate copolymer resins (EEA) and the like.

Preferred typical examples of (B1) are propylene and/or ethylene (co)polymers, and copolymers of propylene and/or ethylene and at least one α-olefin containing 4 to 12 carbon atoms (random or block; weight ratio 9:1 to 1:9).

The melt flow rate (MFR) of (B1) is generally 0.5 to 150, preferably 1 to 100.

The melt flow rate can be determined according to JIS K 6758 (in the case of polypropylene resins: temperature 230° C., load 2.16 kgf; in the case of polyethylene resins: temperature 190° C., load 2.16 kgf). The crystallinity of (B1) is generally 25 to 90%, preferably 30 to 70%.

The crystallinity can be determined by such method as X ray diffraction method or infrared absorption spectrum method [Hatsugoro Minamishino: "Solid Structure of Polymers—Experiments in Polymer Chemistry 2", page 42, Kyoritsu Shuppan (1958)].

As the polystyrene resins (B2), there may be mentioned (co)polymers of more than one of said aromatic vinyl monomers (said styrenes etc.) as well as copolymers of more than one of these monomers and at least one copolymerizable vinyl monomer (weight ratio: generally 5/95 to 95/5, preferably 50/50 to 90/10).

As the copolymerizable vinyl monomer, there may be mentioned said monomers other than aromatic vinyl monomers, for example vinyl esters, acrylic monomers [alkyl($C_1$–$C_{20}$) (meth)acrylates, acrylonitrile, etc.], dienes and halogen-containing vinyl monomers.

Typical examples of (B2) include polystyrene, polyvinyltoluene and the like; copolymers of a styrene and at least one monomer selected from the group consisting of methyl methacrylate, acrylonitrile and butadiene, for example styrene-acrylonitrile copolymers (AS resins), acrylonitrile-butadiene-styrene copolymers (ABS resins), styrene-methyl methacrylate-acrylonitrile copolymers, methyl methacrylate-butadiene-styrene copolymers (MBS resins), styrene-butadiene copolymers and the like.

As the acrylic resins (B3), there may be mentioned (co)polymers of more than one of the above-mentioned acrylic monomers [alkyl($C_1$–$C_{20}$) (meth)acrylates, acrylonitrile, etc.] (e.g. polymethyl methacrylate, polybutyl acrylate, etc.) as well as copolymers of more than one of these monomers and at least one copolymerizable vinyl monomer (weight ratio: generally 5/95 to 95/5, preferably 50/50 to 90/10).

As the copolymerizable vinyl monomer, there may be mentioned said monomers other than said acrylic monomers, for example vinyl esters, dienes and halogen-containing vinyl monomers.

As the rubber-like (co)polymers (B4), there may be mentioned diene (co)polymers, for example polybutadiene, polyisoprene, polychloroprene, ethylene-propylene-butadiene copolymers, acrylonitrile-butadiene copolymers and the like.

As the polyamide resins (B5), there may be mentioned nylon 66, nylon 69, nylon 610, nylon 612, nylon 6, nylon 11, nylon 12, nylon 46, nylon 6/66, nylon 6/12, etc.

As the polyester resins (B6), there may be mentioned aromatic polyesters, for example polyethylene terephthalate, polybutylene terephthalate and polycyclohexanedimethylene terephthalate, and aliphatic polyesters, for example polybutylene adipate, polyethylene adipate and poly-$\epsilon$-caprolactone.

As the polyacetal resins (B7), there may be mentioned homopolymers of formaldehyde or trioxane, for example polyoxymethylene homopolymers, and copolymers of formaldehyde or trioxane and a cyclic ether (the above-mentioned alkylene oxide, such as ethylene oxide or propylene oxide, or dioxolane), for example polyoxymethylene-polyoxyethylene copolymers (block copolymers, polyoxymethylene/polyoxyethylene weight ratio 90 to 99/1 to 10).

As the polycarbonate resins (B8), there may be mentioned bisphenol skeleton-containing polycarbonates, for example condensates of bisphenol A and phosgene and condensates of bisphenol A and carbonate diester.

As the thermoplastic polyurethane resins (B9), there may be mentioned polyurethanes obtained by reacting, by the one-shot or prepolymer process, the above organic diisocyanate with a high-molecular diol [diol with a molecular weight of 500 to 5,000, for example the above polyether diol, polyester diol (polyester diol obtained by reacting the above diol HO—Z—OH and/or polyether diol with a dicarboxylic acid (Q1-4) or the above lactone), polymer polyols obtained by polymerizing a vinyl monomer (e.g. acrylonitrile and/or styrene) in these diols, etc.], together with a chain extender [e.g. the above diol (b0) and/or the above diamine (Q1-3)] and, if necessary together with a reaction terminator (a monohydric alcohol, a primary or secondary monoamine or a mono- or di-alkanolamine)

As the fluorocarbonresins (B10), there may be mentioned (co)polymers of more than one of fluorine-containing monomers, for example fluorinated olefins containing 2 to 10 carbon atoms and 1 to 20 fluorine atoms (tetrafluoroethylene, hexafluoropropylene, perfluorohexylethylene, etc.), fluoroalkyl (containing 1 to 10 carbon atoms) (meth)acrylates [perfluorohexylethyl (meth) acrylate, perfluorooctylethyl (meth)acrylate, etc.].

Preferred among those mentioned above are (B1), (B2) and combinations of (B1) and at least one resin (BB) selected from among (B5), (B6) and (B7)

The amount of resin (BB) to be used in combination with (B1), in accordance with a preferred embodiment of the invention, is 1 to 20 parts, in particular 3 to 15 parts, per 100 parts of (B1) from the viewpoint of more effective manifestation of the antistatic properties owing to block polymer (A) and from the viewpoint of resin moldability.

Preferred among the species of (BB) to be used in combination with (B1) are nylon 6, polybutylene terephthalate, polyethylene terephthalate and polyacetals.

From the viewpoint of antistatic properties [ease of the block polymer (A) being oriented toward the surface of resin moldings] and of ease of kneading resins, the peak melting temperature (melting point) of (BB) as determined by DSC (differential scanning calorimetry) is generally 140 to 270° C., preferably 150 to 260° C., in particular preferably 160 to 240° C.

The intrinsic viscosity [$\eta$] (as determined using an Ubbelohde viscometer; for polyacetal resins: in a 0.5% parachlorophenol solution at 60° C.; for polyester resins: in a 0.5% orthochlorophenol solution at 25° C.; for polyamide resins: in a 0.5% orthochlorophenol solution at 25° C.) of (BB) is not particularly restricted but generally is 0.1 to 4.

The Mn of the thermoplastic resin (B) is generally 20,000 to 500,000.

The amount of (A) to be incorporated in (B) can be varied according to the performance characteristics required but, from the viewpoint of providing sufficient antistatic properties and mechanical strength, the addition amount of (A) is preferably 0.5 to 40%, in particular 1 to 30%, based on the total weight of (A) and (B).

The amount of (B) in the resin composition is preferably 60 to 99.5%, in particular 70 to 99%, based on the total weight of (A) and (B).

In compounding, a resin composition (master batch) containing a high concentration (e.g. 10 to 80% based on the total weight of (A) and (B)) of (A) may be prepared in advance.

For improving the compatibility between (A) and the thermoplastic resin (B) other than the polyolefin resin (B1), in particular, a compatibilizer (E) may be incorporated in the resin composition of the present invention.

The (E) may be incorporated in advance in the antistatic agent comprising (A).

As (E), there may be mentioned modified vinyl polymers having at least one functional group (polar group) selected from the group consisting of carboxyl, epoxy, amino, hydroxyl and polyoxyalkylene groups, specifically polymers described in Japanese Kokai Publication Hei-03-258850, for instance.

The sulfonyl group-containing modified vinyl polymers and block polymers having polyolefin moieties and aromatic vinyl polymer moieties described in Japanese Kokai Publication Hei-06-345927 may also be used.

When (E) is used, the amount of (E) to be used is generally 0.1 to 15%, preferably 1 to 10%, based on the total weight of (A) and (B) in view of the physical properties of the resin.

For further improving the antistatic properties, an alkaline metal and/or alkaline earth metal salt (C) may be incorporated in the resin composition of the present invention, if necessary. (C) may be incorporated in the antistatic agent comprising (A) in advance.

Usable as (C) are salts of alkaline metals (lithium, sodium, potassium, etc.) and/or alkaline earth metals (magnesium, calcium, etc.) with organic acids (mono- or di-carboxylic acids containing 1 to 12 carbon atoms, for example formic acid, acetic acid, propionic acid, oxalic acid, succinic acid, etc.; sulfonic acids containing 1 to 20 carbon atoms, for example methanesulfonic acid, p-toluenesulfonic acid, etc.; thiocyanic acid, etc.) or inorganic acids (hydrohalic acids, for example hydrochloric acid, hydrobromic acid; perchloric acid; sulfuric acid, phosphoric acid, etc.).

As (C), there maybe mentioned potassium acetate, lithium acetate, lithium chloride, magnesium chloride, calcium chloride, sodium bromide, potassium bromide, magnesium bromide, lithium perchlorate, sodium perchlorate, potassium perchlorate, potassium sulfate, potassium phosphate, potassium thiocyanate, and the like.

Preferred among them are halides (in particular preferably lithium chloride, sodium chloride, potassium chloride), acetates (in particular preferably potassium acetate) and perchlorates (in particular preferably potassium perchlorate).

When (C) is used combinedly, the amount of (C) is generally 0.001 to 3%, preferably 0.01 to 2%, based on the weight of (A) so that it may not bleed out onto the resin surface but a good resin appearance may be maintained.

The method of adding (C) is not particularly restricted but, in view of the ease of dispersing it in compositions, it is preferred that it be dispersed in the block polymer (A) in advance.

When (C) is dispersed in (A), it is particularly preferred to add and disperse it in advance in the step of production (polymerization) of (A).

For further improving the antistatic properties, a nonionic, anionic, cationic or amphoteric surfactant (D) may further be incorporated in the resin composition of the present invention.

(D) may be incorporated in advance in the antistatic agent comprising (A).

As the nonionic surfactant, there maybe mentioned higher alcohol-ethylene oxide adducts, fatty acid-ethylene oxide adducts, higher alkylamine-ethylene oxide adducts, polypropylene glycol-ethylene oxide adducts and like polyethylene glycol type nonionic surfactants; polyethylene oxide, glycerol fatty acid esters, pentaerythritol fatty acid esters, sorbitol or sorbitan fatty acid esters, polyhydric alcohol alkyl ethers, alkanolamine fatty amides and like polyhydric alcohol type nonionic surfactants.

Usable as the anionic surfactant are compounds other than (C), for example carboxylic acid salts such as higher fatty acid alkaline metal salts; sulfate ester salts such as higher alcohol sulfate ester salts and higher alkyl ether sulfate ester salts; sulfonic acid salts such as alkylbenzenesulfonic acid salts, alkylsulfonic acid salts and paraffinsulfonic acid salts; phosphate ester salts such as higher alcohol phosphate ester salts; and so forth.

The cationic surfactant includes quaternary ammonium salts such as alkyltrimethylammonium salts.

The amphoteric surfactant includes amino acid type amphoteric surfactants such as higher alkylaminopropionic acid salts, betaine type amphoteric surfactants such as higher alkyldimethylbetaines and higher alkyldihydroxyethylbetaines, and so on.

These may be used singly or two or more of them may be used in combination.

Among them, anionic surfactants are preferred, and sulfonic acid salts such as alkylbenzenesulfonic acid salts, alkylsulfonic acid salts and paraffin sulfonic acid salts are particularly preferred.

When (D) is used, the amount of (D) is generally 0.001 to 5%, preferably 0.01 to 3%, based on the total weight of (A) and (B).

The method of adding (D) is not particularly restricted, either, but, for effectively dispersing it in resin compositions, it is preffered that it be dispersed in (A) in advance.

When (D) is dispersed in (A), it is particularly preferred to add and disperse said (D) already in the step of production (polymerization) of (A).

Furthermore, a polyetheresteramide or a like polymer type antistatic agent known in the art may be incorporated in the resin composition of the present invention, when necessary.

The known polymer type antistatic agent may be incorporated in the antistatic agent of the present invention which comprises (A).

As the polymer type antistatic agent, there may be mentioned polyetheresteramides, for example polyetheresteramides derived from bisphenol A-polyoxyalkylene adducts as described in Japanese Kokai Publication Hei-07-10989, for instance.

The amount of polymer type antistatic agent to be used is generally 0 to 40%, preferably 1 to 30%, in particular preferably 5 to 20%, based on the total weight of (A) and (B)

Another or other resin additives may arbitrarily added to the resin composition of the present invention according to the intended use thereof each at an addition amount at which the characteristics of the composition will not be adversely affected.

The other resin additives may be incorporated beforehand in the antistatic agent of the invention which comprises (A).

The other resin additives include pigments, dyes, fillers (organic and/or inorganic fillers), nucleating agents, glass fiber, lubricants, plasticizers, mold release agents, antioxidants, flame retardants, ultraviolet absorbers, antimicrobial agents and the like.

The resin composition of the invention can be obtained by melting and mixing (A) or an antistatic agent comprising (A) and (B) together.

The melting and mixing can be effected in the conventional manner. Thus, the method comprising blending polymers generally in a pellet or powder form in an appropriate mixer, for example a henschel mixer, and then melting and mixing the mixture in an extruder to give pellets can be applied.

The order of addition of respective components in the step of kneading is not restricted. For example, there may be mentioned A) the method comprising blending (A) or an antistatic agent containing (A) with (B) and kneading the mixture, B) the method comprising blending and kneading a small portion of (B) with (A) or an antistatic agent containing (A), together with (C) and (D) and then blending and kneading the blend with the remaining portion of (B), and C) the method comprising blending and kneading (A) or an antistatic agent containing (A) with (C) and (D) and then blending and kneading the blend with (B).

Among them, the methods B) and C) are each referred to as master batch method or master pellet method.

For obtaining the resin composition of the present invention, there may be mentioned, for example, the method which comprises preparing a master batch by blending and kneading 100 parts of a mixture composed of (A) or an antistatic agent comprising (A), (C) and (D) [preferably comprising 100 parts of (A), 0 or 0.01 to 3 parts, in particular preferably 0 or 0.03 to 2 parts, of (C) and 0 or 0.1 to 20 parts, in particular preferably 0 or 0.2 to 10 parts, of (D)] with (B) generally in an amount of 0 or 0.1 to 50 parts, preferably 0 or 5 to 20 parts and then further blending and kneading this master batch with the remaining portion of (B).

This method is advantageous in that small amounts of (A), (C) and (D) can be dispersed uniformly in a large amount of (B).

The resin composition of the present invention can be molded by injection molding, compression molding, calender molding, slush molding, rotational molding, extrusion molding, blow molding, film molding (e.g. casting, tentering, inflation) or any other arbitrary technique suited for the purpose.

The molding comprised of the resin composition of the present invention have excellent mechanical strength and permanent antistatic properties and at the same time have good coatability and printability.

The moldings or shaped products obtainable by coating of or printing on the moldings comprised of the resin composition of the invention, which comprises (A), also constitute an aspect of the present invention.

The method of coating said moldings mentioned above is not restricted but includes, air spray coating, airless spray coating, static spray coating, dip coating, roller coating and brushing, among others.

As the coatings, there may be mentioned, among others, polyester melamine resin-based coatings, epoxy melamine resin-based coatings, acrylic melamine resin-based coatings, acrylic urethane resin-based coatings and other coatings generally used in coating plastics.

The coating film thickness (dried film thickness) can adequately be selected according to the intended purpose and generally is 10 to 50 $\mu$m.

For printing on the moldings, any of those printing methods generally used in printing on plastics may be used, including gravure printing, flexographic printing, screen printing and offset printing, among others.

As for the printing ink, any of those generally used in plastics printing can be used.

Furthermore, the block polymer (A) or the antistatic agent comprising (A) can be added to those coatings or solvents (e.g. xylene, toluene, etc.) which are known in the art to thereby prepare coatings for antistatic products.

BEST MODE FOR CARRYING OUT THE INVENTION

The following examples are further illustrative but by no means limitative of the present invention.

In the following description, all parts are by weight.

Production Example 1

Under nitrogen, 85 parts of a low-molecular polypropylene with an Mn value of 2,500 and a density of 0.89 as obtained by the thermal degradation method and 15 parts of maleic anhydride were melted together at 200° C. and reacted for 20 hours.

Then, the excess maleic anhydride was distilled off under reduced pressure to give an acid-modified polypropylene (a1-1 ①).

The acid value of (a1-1①) was 39.8 and the Mn value was 2,800.

Production Example 2

A low-molecular polypropylene (80 parts) with an Mn value of 2,500 and a density of 0.89 as obtained by the thermal degradation method was melted at 160° C., and following addition of 7 parts of maleic anhydride and 14 parts of 12-aminododecanoic acid, the reaction was conducted at 160° C. for 1 hour under nitrogen.

The reaction was further continued at 200° C. for 20 hours to give an acid-modified polypropylene (a1-1②).

The acid value of (a1-1②) was 32.1 and the Mn value was 2,800.

Production Example 3

A low-molecular polypropylene (65 parts) with an Mn value of 1,200 and a density of 0.89 as obtained by the thermal degradation method was melted at 160° C., and following addition of 11 parts of maleic anhydride and 24 parts of 12-aminododecanoic acid, the reaction was conducted at 160° C. for 1 hour under nitrogen.

The reaction was further continued at 200° C. for 20 hours to give an acid-modified polypropylene (a1-1③).

The acid value of (a1-1③) was 62.3 and the Mn value was 1,800.

Production Example 4

A low-molecular polypropylene (98.5 parts) with an Mn value of 12,000 and a density of 0.89 as obtained by the thermal degradation method and 1.5 parts of maleic anhydride were melted at 200° C. and reacted for 20 hours under nitrogen.

Then, the excess maleic anhydride was distilled off under reduced pressure to give an acid-modified polypropylene (a1-1 ④).

The acid value of (a1-1④) was 4.6 and the Mn value was 12,200.

Production Example 5

A low-molecular polypropylene (47 parts) with an Mn value of 300 and a density of 0.89 as obtained by the thermal degradation method was melted at 160° C., and following addition of 30 parts of maleic anhydride and 23 parts of glycine, the reaction was conducted at 160° C. for 1 hour under nitrogen.

The reaction was further continued at 200° C. for 20 hours to give an acid-modified polypropylene (a1-1⑤).

The acid value of (a1-1⑤) was 170.1 and the Mn value was 630.

Production Example 6

A stainless steel autoclave was charged with 41 parts of the acid-modified polypropylene (a1-1①) obtained in Production Example 1, 59 parts of a polyethylene glycol with an Mn value of 4,000 (b1①, volume resistivity 5×10$^8$ Ω·cm), 0.3 part of antioxidant (Irganox 1010; Ciba-Geigy; the same applies hereinafter) and 0.5 part of zirconium acetate, and the polymerization was carried out at 230° C. under a reduced pressure of not over 1 mmHg for 3 hours to give a viscous polymer.

This polymer was taken out in a strand form on a belt and pelletized to give a block polymer of the invention (A1①).

The Mn of (A1①) was 22,000. Based on this Mn value and by $^1$H-NMR analysis, the mean number (Nn) of repetitions of (A1 ①) was found to be 3.2.

Production Example 7

A stainless steel autoclave was charged with 64 parts of the acid-modified polypropylene (a1-1②) obtained in Production Example 2, 36 parts of a polyethylene glycol with an Mn value of 2,000 (b1②, volume resistivity $8\times10^8$ Ω·cm), 0.3 part of antioxidant and 0.5 part of zirconium acetate and the polymerization was carried out at 230° C. under a reduced pressure of not over 1 mmHg for 4 hours to give a viscous polymer.

Thereafter, the same procedure as in Production Example 6 was followed to give a block polymer (A1②).

The Mn of (A1②) was 25,000. Based on this Mn value and by $^1$H-NMR analysis, the mean number of repetitions (Nn) of (A1 ②) was found to be 5.0.

Production Example 8

A stainless steel autoclave was charged with 55 parts of the acid-modified polypropylene (a1-1③) obtained in Production Example 3, 45 parts of a polyethylene glycol with an Mn value of 1,500 (b1③, volume resistivity $1\times10^9$ Ω·cm), 0.3 part of antioxidant, and 0.5 part of zirconium acetate and the polymerization was carried out at 230° C. under a reduced pressure of not more than 1 mmHg for 5 hours to give a viscous polymer.

Thereafter, the same procedure as in Production Example 6 was followed to give a block polymer (A1③).

The Mn value of (A1③) was 35,000. Based on this Mn value and by $^1$H-NMR analysis, the mean number of repetitions (Nn) of (A1③) was found to be 10.1.

Production Example 9

A stainless steel autoclave was charged with 30 parts of the modified polyolefin (a1-1④) obtained in Production Example 4, 22.5 parts of 12-aminododecanoic acid, 3.3 parts of adipic acid and 0.3 partof Irganox 1010 (antioxidant, Ciba-Geigy) and, after nitrogen purging, the charge was stirred in hermetically closed condition under pressure at a temperature of 220° C. for 4 hours.

Then, 47.5 parts of a bisphenol A-ethylene oxide adduct with an Mn value of 2,000 and 0.3 part of zirconium acetate were added and the polymerization was carried out at 230° C. under a reduced pressure of not over 1 mmHg for 5 hours to give a viscous polymer.

Thereafter, the same procedure as in Production Example 6 was followed to give a block polymer of the invention (A2①).

The Mn of (A2①) was 32,000. Based on this Mn value and by $^1$H-NMR analysis, (A2①) was found to be an a-b type block polymer.

When the (b2①) for constituting (A2①) was prepared by the following procedure and the volume resistivity was measured. The value was $5\times10^8$ Ω·cm.

A stainless steel autoclave was charged with 22.5 parts of 12-aminododecanoic acid, 3.3 parts of adipic acid and 0.3 part of Irganox 1010 (antioxidant, Ciba-Geigy), and after nitrogen purging, the charge was stirred in hermetically closed condition under pressure at 220° C. for 4 hours.

Then, 47.5 parts of a bisphenol A-ethylene oxide adduct with an Mn value of 2,000 and 0.3 part of zirconium acetate were added and the polymerization was carried out at 230° C. under a reduced pressure of not over 1 mmHg for 5 hours to give a viscous polymer (b2①)

Production Example 10

A stainless steel autoclave was charged with 105 parts of ε-caprolactam, 17.1 parts of adipic acid, 0.3 part of Irganox 1010, and 6 parts of water, and after nitrogen purging, the charge was stirred in hermetically closed condition under pressure at 220° C. for 4 hours to give 117 parts of a polyamide oligomer having carboxyl groups at both termini and having an acid value of 110.

Then, 125 parts of the modified polyolefin (a1-1④) obtained in Production Example 4, 180 parts of a polyethylene glycol with an Mn value of 1,500 and 0.5 part of zirconium acetate were added and the polymerization was carried out at 230° C. under a reduced pressure of not over 1 mmHg for 5 hours to give a viscous polymer.

Thereafter, the same procedure as in Production Example 6 was followed to give a block polymer (A2②).

The Mn of (A2②) was 40,000. Based on this Mn value and by $^1$H-NMR analysis, (A2②) was found to be an a-b-a type block polymer.

The (b2②) for constituting (A2②) was prepared by the following procedure and the volume resistivity was measured. The result was $2\times10^8$ Ω·cm.

A stainless steel autoclave was charged with 105 parts of ε-caprolactam, 17.1 parts of adipic acid, 0.3 part of Irganox 1010, and 6 parts of water, and after nitrogen purging, the charge was stirred in hermetically closed condition under pressure at 220° C. for 4 hours to give 117 parts of a polyamide oligomer having carboxyl groups at both termini and having an acid value of 110.

Then, 180 parts of a polyethylene glycol with an Mn value of 1,500 and 0.5 part of zirconium acetate were added and the polymerization was carried out at 230° C. under a reduced pressure of not over 1 mmHg for 5 hours to give a viscous polymer (b2②).

Production Example 11

A glass autoclave was charged with 41 parts of N-methyldiethanolamine, 49 parts of adipic acid and 0.3 part of zirconium acetate and, after nitrogen purging, the temperature was increased over 2 hours to 220° C. Then, the pressure was decreased over 1 hour to 1 mmHg and a polyesterification reaction was carried out. After completion of the reaction, the mixture was cooled to 50° C. and dissolved by adding 100 parts of methanol.

With the internal temperature of the reactor being maintained at 120° C. under constant stirring, 31 parts of dimethyl carbonate was gradually added dropwise over 3 hours and the reaction mixture, followed by reacting for 6 hours at the same temperature. After cooling to room temperature, 100 parts of a 60% aqueous solution of hexafluorophosphoric acid was added and the mixture was stirred at room temperature for 1 hour.

The solvent was then distilled off under reduced pressure to give a cationic polymer (b3①) having an mean of 12 quaternary ammonium salt-containing groups per molecule (hydroxyl value 30.1, acid value 0.5, volume resistivity $9\times10^6$ Ω·cm).

Production Example 12

A stainless steel autoclave was charged with 52 parts of the cationic polymer obtained in Production Example 11, 48 parts of the acid-modified polypropylene (a1-1②) obtained in Production Example 2, 0.3 part of antioxidant and 0.5 part of zirconium acetate and the polymerization was carried out at 230° C. under a reduced pressure of not over 1 mmHg for 4 hours to give a viscous polymer.

Thereafter, the same procedure as in Production Example 6 was followed to give a block copolymer (A3①).

The Mn value of (A3①) was 28,000. Based on this Mn value and by $^1$H-NMR analysis, the mean number of repetitions (Nn) of (A3①) was found to be 4.1.

Production Example 13

A reactor was charged with 67 parts of a polyethylene glycol with an Mn value of 300, 49 parts of dimethyl 5-sulfoisophthalate sodium salt and 0.2 part of dibutyltin oxide. The temperature was increased to 190° C. under a reduced pressure of 5 mmHg and a transesterification reaction was carried out for 6 hours, with the byproduct methanol being constantly distilled off. By this procedure, an anionic polymer (b4①) having an mean of 5 sodium sulfonate groups per molecule (hydroxyl value 29.6, acid value 0.4, volume resistivity $2 \times 10^8$ Ω·cm) was obtained.

Production Example 14

A stainless steel autoclave was charged with 52 parts of the anionic polymer (b4①) obtained in Production Example 13, 48 parts of the acid-modified polypropylene (a1-1②) obtained in Production Example 2, 0.3 part of antioxidant and 0.5 part of zirconium acetate and the polymerization was carried out at 230° C. under a reduced pressure of not over 1 mmHg for 4 hours to give a viscous polymer.

Thereafter, the same procedure as in Production Example 6 was followed to give a block polymer (A4①).

The Mn of (A4①) was 24,000. Based on this Mn value and by $^1$H-NMR analysis, the mean number of repetitions (Nn) of (A4①) was found to be 3.5.

Production Example 15

A stainless steel autoclave was charged with 64 parts of the acid-modified polypropylene (a1-1②) obtained in Production Example 2, 36 parts of a polyethylene glycol with an Mn value of 2,000 (b1②, volume resistivity $8 \times 10^8$ Ω·cm), 0.3 part of antioxidant and 0.5 part of zirconium acetate and the polymerization was carried out at 230° C. under a reduced pressure of not over 1 mmHg for 1 hour to give a viscous polymer.

Thereafter, the same procedure as in Production Example 6 was followed to give a block copolymer (A'①).

The Mn of (A'①) was 7,000. Based on this Mn value and by $^1$H-NMR analysis, the mean number of repetitions (Nn) of (A'①) was found to be 1.5.

Production Example 16

A stainless steel autoclave was charged with 55 parts of the acid-modified polypropylene (a1-1③) obtained in Production Example 3, 45 parts of a polyethylene glycol with an Mn value of 1,500 (b1③, volume resistivity $1 \times 10^9$ Ω·cm), 0.3 part of antioxidant and 0.5 part of zirconium acetate and the polymerization was carried out at 230° C. under a reduced pressure of not over 1 mmHg for 0.5 hour to give a viscous polymer.

Thereafter, the same procedure as in Production Example 6 was followed to give a block polymer (A'②).

The Mn of (A'②) was 3,500. Based on this Mn value and by $^1$H-NMR analysis, the mean number of repetitions of (A'②) was found to be 1.0.

Production Example 17

A stainless steel autoclave was charged with 63 parts of the acid-modified polypropylene (a1-1⑤) obtained in Production Example 5, 37 parts of a polyethylene glycol with an Mn value of 400, 0.3 part of antioxidant and 0.5 part of zirconium acetate and the polymerization reaction was carried out at 230° C. under a reduced pressure of not over 1 mmHg for 30 hours to give a viscous polymer.

Thereafter, the same procedure as in Production Example 6 was followed to give a block polymer (A'③).

The Mn of (A'③) was 52,000. Based on this Mn value and by $^1$H-NMR analysis, the mean number (Nn) of repetitions of (A'③) was found to be 55.2.

Production Example 18

A stainless steel autoclave was charged with 110 parts of 12-aminododecanoic acid, 16.3 parts of adipic acid and 0.3 part of Irganox 1010 and, after nitrogen purging, the charge was stirred under pressure at 220° C. in hermetically closed condition for 4 hours to give 117 parts of a polyamide oligomer having carboxyl groups at both termini (acid value 107).

Then, 225 parts of a bisphenol A-ethylene oxide adduct with an Mn value of 2,000 and 0.5 part of zirconium acetate were added and the polymerization was carried out at 240° C. under a reduced pressure of not over 1 mmHg for 5 hours to give a viscous polymer.

Thereafter, the same procedure as in Production Example 6 was followed to give a polyetheresteramide (A'④).

Production Example 19

A stainless steel autoclave was charged with 105 parts of ε-caprolactam, 17.1 parts of adipic acid, 0.3 part of Irganox 1010 and 6 parts of water and, after nitrogen purging, the charge was stirred under pressure at 220° C. in hermetically closed condition for 4 hours to give 117 parts of a polyamide oligomer having carboxyl groups at both termini (acid value 110).

Then, 175 parts of a polyethylene glycol with an Mn value of 1,500 and 0.5 part of zirconium acetate were added and the polymerization was carried out at 245° C. under a reduced pressure of not over 1 mmHg for 5 hours to give a viscous polymer.

Thereafter, the same procedure as in Production Example 6 was followed to give a polyetheresteramide (A'⑤).

Production Example 20

Under nitrogen, 95 parts of a low-molecular polypropylene with an Mn value of 12,000 and a density of 0.89 as obtained by the thermal degradation method and 5 parts of maleic anhydride was melted at 180° C. Then, a 50% xylene solution containing 1.5 parts of dicumyl peroxide dissolved therein was added dropwise over 15 minutes and the reaction was conducted for 1 hour. The solvent was then distilled off to give a modified vinyl polymer (E①) for use as a compatibilizing agent.

The acid value and Mn value of (E①) were 25.7 and 15,000, respectively.

EXAMPLES 1 TO 16

Comparative Examples 1 to 4

According to the recipes (in parts) shown in Table 1, the block polymer (A1①, A1②, A1③, A2①, A2②, A3①, A4①, A'①, A'②, A'③) or polyetheramide (A'④, A'⑤) and the thermoplastic resin (B1①, B1②), as well as an alkaline metal salt, a surfactant or a modified vinyl polymer (E①), as the case may be, were blended with a henschel mixer for 3 minutes. Then, using a vented twin-screw extruder, the blends were respectively melt-kneaded under the conditions of 240° C., 100 rpm and a residence time of 5 minutes to give resin compositions of the invention (Examples 1 to 13) and reference resin compositions (Comparative Examples 1 to 7).

adhesion, water resistance, coating efficiency) were evaluated by the following methods. The results are shown in Table 2.

(1) Impact strength: ASTM D256 (notched, 3.2 mm thick), measured by Method A.
(2) Flexural modulus: ASTM D790 Testpiece (10×4×100 mm), distance between supports: 60 mm
(3) Compatibility: The testpiece (100×100×2 mm) was bent and the failing section was macroscopically evaluated. Evaluation criteria:
 O: good
 X: poor compatibility of A and B, delamination observed
(4) Surface resistivity: The testpiece (100×100×2 mm) was measured using a megohmmeter C (Advantest) in an atmosphere of 23° C., 50% RH (based on ASTM D257).

TABLE 1

| | | Example | | | | | | | | | | | | | Comparative Example | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 1 | 2 | 3 | 4 | 5 | 6 | 7 |
| Block polymer (A) | A1① | 10 | 10 | 10 | 10 | | | | | | | | | | | | | | | | |
| | A1② | | | | | 10 | 10 | | | | | | | | | | | | | | |
| | A1③ | | | | | | | 10 | 10 | | | | | | | | | | | | |
| | A2① | | | | | | | | | 10 | 10 | | | | | | | | | | |
| | A2② | | | | | | | | | | | 10 | | | | | | | | | |
| | A3① | | | | | | | | | | | | 10 | | | | | | | | |
| | A4① | | | | | | | | | | | | | 10 | | | | | | | |
| | A'① | | | | | | | | | | | | | | 10 | 10 | | | | | |
| | A'② | | | | | | | | | | | | | | | | 10 | | | | |
| | A'③ | | | | | | | | | | | | | | | | | 10 | | | |
| Polyether-esteramide | A'④ | | | | | | | | | | | | | | | | | | 10 | 10 | |
| | A'⑤ | | | | | | | | | | | | | | | | | | | | 10 |
| Thermo-plastic resin (B) | B1① | 90 | | 90 | | 90 | | 90 | | 90 | | 90 | 90 | 90 | 90 | | 90 | 90 | 85 | | 85 |
| | B2② | | 90 | | 90 | | 90 | | 90 | | 90 | | | | | 90 | | | | 85 | |
| Compati-bilizer (E) | E① | | | | | | | | | | | | | | | | | | 5 | 5 | 5 |
| Alkaline metal salt (C) | C①1 | | | | | 0.05 | | | | | 0.05 | | | | | | | | | 0.05 | |
| | C②2 | | | 0.05 | | | | | 0.05 | | | | 0.05 | | | | | | | | |
| Surfactant (D) | D①1 | | 0.3 | | 0.3 | | | 0.3 | | | | 0.3 | | | | | 0.3 | | | | |

(Notes)
B1①: polypropylene [tradename: Ubepolypro J609, product of Ube Industries, Ltd.]
B2②: ABS resin [tradename: ABS10, product of Technopolymer]
C1①: lithium chloride
C2②: potassium acetate
D1①: sodium dodecylbenzenesulfonate The above C1①, C2② and D1① were added in the stage of block polymer production [simultaneously with addition of hydrophilic polymer (b)].

Performance Testing

The resin compositions of the invention and the reference resin compositions were respectively molded into testpieces with an injection molding machine at a cylinder temperature of 240° C. and a mold temperature of 50° C. and these testpieces were used for the evaluation of impact strength, flexural modulus, compatibility, surface resistivity, volume resistivity, surface resistivity after aqueous washing, primary adhesion, water resistance and coating efficiency.

In addition, testpieces were prepared with a compression molding machine under the conditions of temperature 200° C., pressure 20 kg/cm$^2$ and time 30 seconds and these testpieces were used for the evaluation of surface resistivity.

Using the above testpieces, the resin mechanical strength (impact strength, flexural modulus, compatibility), antistaticity (surface resistivity, volume resistivity, surface resistivity after aqueous washing) and coatability (primary (5) Volume resistivity: The testpice (100×100×2 mm) was measured using a megohmmeter C (Advantest) in an atmosphere of 23° C., 50% RH (ASTM D257).
(6) Surface resistivity after aqueous washing: The testpiece (100×100×2 mm) was washed with water and dried with a forward-current air dryer at 80° C. for 3 hours. This operation was repeated 10 times and using a megohmmeter C (Advantest), the surface resistivity was measured in an atmosphere of 23° C., 50% R (ASTM D257).
(7) Coating test: The testpiece (100×100×2 mm) was grounded and an electrostatic coating was carried out using an air current-static electricity double atomizing electrostatic coating machine (Turboniar G Mini Bell automatic electrostatic coater, manufactured by Ransberg Japan) (application voltage=−90 KV, amount of delivery=100 cc/min, rotational speed=24,000 rpm, atomizing head diameter=70 mm, a two-package urethane paint=Hi-Urethane #5000, manufactured by NIPPON OIL AND FT Corporation). The coated panel was baked at 80° C. for 2 hours and tested for the followings.

Primary adhesion: A cross-cut test according to JIS K5400 (1990) was performed on the coating side of the coated panel.

Water resistance: The coated panel was immersed in warm water at 50° C. for 240 hours and a cross-cut test was carried out according to JIS K5400 (1990).

Coating efficiency: This parameter value was calculated by means of the following equation.

Coating efficiency=(weight of testpiece after coating−weight of testpiece before coating)×100÷(bone-dry weight of paint applied)

(Note) The testpieces according to Examples 1, 3, 5, 7, 9, 11, 12 and 13 and Comparative Examples 1, 3, 4, 5 and 7, wherein a thermoplastic resin (B1①) was formulated, were subjected to a corona discharge treatment in advance of the coating test.

In addition, when supplemented with a metal salt or a surfactant, the resins exhibit particularly outstanding performances (surface resistivity conducive to permanent antistaticity and coating efficiency).

Industrial Applicability

The block polymer and the antistatic agent comprising the same can provide resins with such high level permanent antistatic properties that cannot have been attained in the prior art.

Furthermore, they can provide very good coatability and are further effective in providing excellent mechanical characteristics. In view of the above effects, the block polymer of the invention is a very useful polymer for use as or in an antistatic agent for various moldings, such as housings or like products for home electrification or OA electric or electronic appliances or devices, devices for playing games

TABLE 2

| | Mechanical strength of resin | | | Antistatic properties | | | | Coatability | | |
|---|---|---|---|---|---|---|---|---|---|---|
| | Impact strength kg·fcm/cm² | Flexural modulus kg·f/cm² | Compatibility | Surface intrinsic resistivity1) Ω | Surface intrinsic resistivity2) Ω | Volume intrinsic resistivity Ω cm | Surface intrinsic resistivity after aqueous washing Ω | Primary adhesion | Water resistance | Coating efficiency % |
| Ex. 1 | 38 | 15,000 | o | $4 \times 10^{11}$ | $6 \times 10^{11}$ | $8 \times 10^{11}$ | $5 \times 10^{11}$ | 100/100 | 100/100 | 78 |
| Ex. 2 | 14 | 13,000 | o | $2 \times 10^{11}$ | $5 \times 10^{11}$ | $5 \times 10^{11}$ | $3 \times 10^{11}$ | 100/100 | 100/100 | 76 |
| Ex. 3 | 37 | 16,000 | o | $1 \times 10^{10}$ | $4 \times 10^{10}$ | $5 \times 10^{11}$ | $1 \times 10^{10}$ | 100/100 | 100/100 | 91 |
| Ex. 4 | 15 | 13,000 | o | $2 \times 10^{10}$ | $4 \times 10^{10}$ | $5 \times 10^{10}$ | $4 \times 10^{10}$ | 100/100 | 100/100 | 89 |
| Ex. 5 | 39 | 15,500 | o | $3 \times 10^{10}$ | $4 \times 10^{10}$ | $6 \times 10^{10}$ | $4 \times 10^{11}$ | 100/100 | 100/100 | 86 |
| Ex. 6 | 15 | 13,500 | o | $9 \times 10^{10}$ | $2 \times 10^{11}$ | $4 \times 10^{11}$ | $1 \times 10^{11}$ | 100/100 | 100/100 | 86 |
| Ex. 7 | 38 | 15,000 | o | $8 \times 10^{10}$ | $1 \times 10^{11}$ | $2 \times 10^{11}$ | $8 \times 10^{10}$ | 100/100 | 100/100 | 80 |
| Ex. 8 | 15 | 13,000 | o | $1 \times 10^{11}$ | $2 \times 10^{11}$ | $5 \times 10^{11}$ | $2 \times 10^{11}$ | 100/100 | 100/100 | 72 |
| Ex. 9 | 40 | 16,000 | o | $5 \times 10^{10}$ | $6 \times 10^{10}$ | $2 \times 10^{11}$ | $3 \times 10^{11}$ | 100/100 | 100/100 | 90 |
| Ex. 10 | 16 | 13,500 | o | $4 \times 10^{10}$ | $6 \times 10^{10}$ | $1 \times 10^{11}$ | $1 \times 10^{11}$ | 100/100 | 100/100 | 88 |
| Ex. 11 | 39 | 15,500 | o | $9 \times 10^{10}$ | $2 \times 10^{11}$ | $4 \times 10^{11}$ | $9 \times 10^{10}$ | 100/100 | 100/100 | 80 |
| Ex. 12 | 38 | 16,000 | o | $2 \times 10^{11}$ | $5 \times 10^{11}$ | $6 \times 10^{11}$ | $3 \times 10^{11}$ | 100/100 | 100/100 | 70 |
| Ex. 13 | 40 | 16,500 | o | $4 \times 10^{11}$ | $6 \times 10^{11}$ | $7 \times 10^{11}$ | $4 \times 10^{11}$ | 100/100 | 100/100 | 74 |
| Compar. Ex. 1 | 28 | 12,000 | x | $7 \times 10^{13}$ | $2 \times 10^{14}$ | $5 \times 10^{14}$ | $5 \times 10^{14}$ | 90/100 | 75/100 | 55 |
| Compar. Ex. 2 | 12 | 8,500 | x | $9 \times 10^{13}$ | $4 \times 10^{14}$ | $9 \times 10^{14}$ | $1 \times 10^{15}$ | 95/100 | 50/100 | 56 |
| Compar. Ex. 3 | 30 | 11,000 | x | $5 \times 10^{14}$ | $8 \times 10^{14}$ | $2 \times 10^{15}$ | $9 \times 10^{14}$ | 85/100 | 55/100 | 45 |
| Compar. Ex. 4 | 31 | 10,000 | x | $2 \times 10^{14}$ | $5 \times 10^{14}$ | $9 \times 10^{14}$ | $7 \times 10^{14}$ | 90/100 | 80/100 | 50 |
| Compar. Ex. 5 | 31 | 12,000 | o | $5 \times 10^{13}$ | $8 \times 10^{13}$ | $3 \times 10^{14}$ | $4 \times 10^{14}$ | 100/100 | 95/100 | 52 |
| Compar. Ex. 6 | 11 | 8,000 | o | $4 \times 10^{13}$ | $9 \times 10^{13}$ | $3 \times 10^{14}$ | $1 \times 10^{14}$ | 100/100 | 90/100 | 51 |
| Compar. Ex. 7 | 30 | 10,000 | o | $1 \times 10^{14}$ | $4 \times 10^{14}$ | $5 \times 10^{14}$ | $6 \times 10^{14}$ | 100/100 | 90/100 | 50 |

1) Measured for injection-molded testpieces
2) Measured for compression-molded testpieces It will be apparent from Table 2 that, compared with Comparative Examples 1 to 7, the physical properties of the resins supplemented with the block polymer of the invention are superior in resin mechanical strength, surface resistivity conducive to antistaticity ($\leq 1 \times 10^{13} \Omega$), and coatability.

Furthermore, the resins supplemented with the block polymer of the invention showed surface resistivity values conducive to antistaticity regardless of the molding methods.

Moreover, this antistaticity is not compromised by aqueous washing but persists semi-permanently.

and office equipment, various plastics containers such as IC trays, various packaging films, flooring sheets, artificial turf, mats and automotive parts, which are shaped by various molding methods such as injection molding, compression molding, calender molding, slush molding, rotational molding, extrusion molding, blow molding, film molding (e.g. casting, tentering, inflation).

What is claimed is:

1. A block polymer (A)
   which has a structure such that blocks of a polyolefin (a) and blocks of a hydrophilic polymer (b) having a volume resistivity of $10^5$ to $10^{11}$ Ω·cm are bonded together alternately and repeatedly with the mean number (Nn) of repetitions being 2 to 50.

2. The block polymer according to claim 1, wherein the (A) has a number average molecular weight of 2,000 to 60,000 as determined by gel permeation chromatography.

3. The block polymer according to claim 1, wherein the (a) is a polyolefin (a1) having carbonyl groups at both polymer termini and/or a polyolefin (a4) having a carbonyl group at one polymer terminus.

4. The block polymer according to claim 1, wherein the (A) comprises a block polymer (A1) having a repeating unit represented by the following general formula (1):

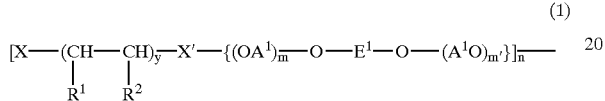
(1)

wherein, in the general formula (1), n is an integer of 2 to 50, one of $R^1$ and $R^2$ represents a hydrogen atom and the other is a hydrogen atom or an alkyl group containing 1 to 10 carbon atoms, y is an integer of 15 to 800, $E^1$ represents the residue of a diol (b0) after removal of the hydroxyl groups, $A^1$ represents an alkylene group containing 2 to 4 carbon atoms, m and m' each represents an integer of 1 to 300, X and X' respectively represent a group selected from among the groups represented by the following general formulas (2) to (8) and one selected from among the groups represented by the corresponding general formulas (2') co (8'), namely when X is a group represented by the general formula (2), X' is a group represented by the general formula (2'), the relationship between general formulas (3) to (8) and general formulas (3') to (8') being the same:

X

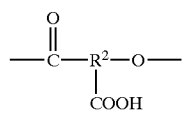
(2)

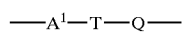
(3)

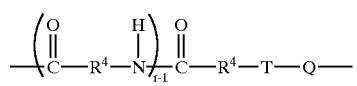
(4)

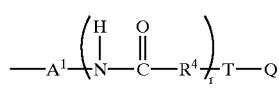
(5)

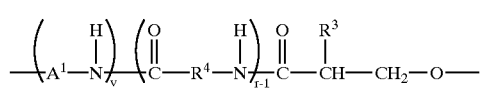
(6)

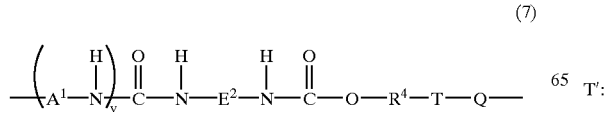
(7)

-continued

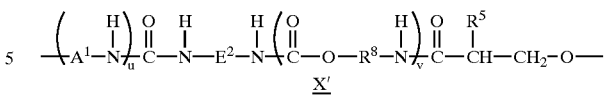
(8)

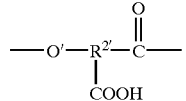
(2')

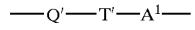
(3')

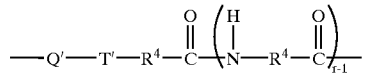
(4')

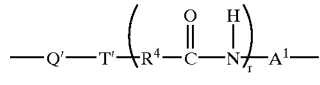
(5')

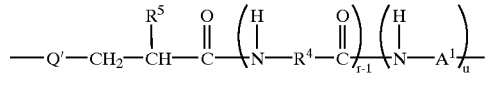
(6')

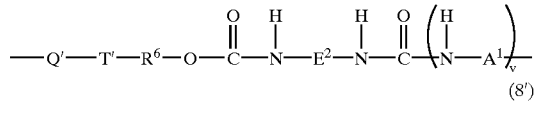
(7')

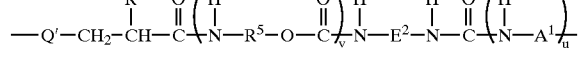
(8')

wherein, in the general formulas (2) to (8) and (2') to (8'), $R^3$ and $R^{3'}$ each represents a trivalent hydrocarbon group containing 2 or 3 carbon atoms, $R^4$ represents a divalent hydrocarbon group containing 1 to 11 carbon atoms, $R^5$ represents a hydrogen or an alkyl group containing 1 to 10 carbon atoms, $R^6$ represents a hydrocarbon group containing 2 to 22 carbon atoms, $E^2$ represents an organic diisocyanate residue, r is 1 to 10, u and v each is 0 or 1, Q, Q', T and T' are groups represented by the following formulas, respectively:

Q:

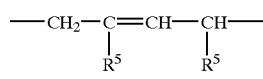

Q':

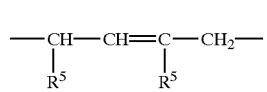

T:

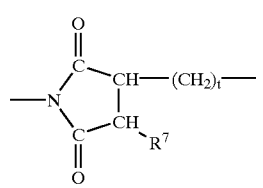

T':

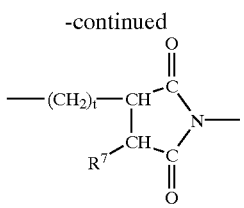

wherein R⁵ is a hydrogen atom or an alkyl group containing 1 to 10 carbon atoms, R⁷ is a hydrogen atom or a methyl group and t is 0 when R⁷ is a methyl group or 1 when R⁷ is a hydrogen atom.

5. The block polymer according to claim 4,
wherein E¹ in the general formula (1) is a residue of an aliphatic dihydric alcohol, a dihydric phenol or a tertiary amino group-containing diol after removal of the hydroxyl groups.

6. The block polymer according to claim 1,
wherein the (b) is a cationic polymer (b3) containing, within the molecule thereof, 2 to 80 cationic groups (c2) separated by a nonionic molecular chain (c1).

7. The block polymer according to claim 6,
wherein the (c2) is a group containing a guaternary ammonium salt or phosphonium salt moiety.

8. The block polymer according to claim 7,
wherein a counter anion to the (c2) is an anion of a super strong acid resulting from combination of a protic acid (d1) and a Lewis acid (d2).

9. The block polymer according to claim 8,
wherein the counter anion to the (c2) is a super strong acid anion having a Hammett acidity function (—H₀) of 12 to 20.

10. The block polymer according to claim 6,
wherein the counter anion to the (c2) comprises at least one anion selected from the group consisting of $BF_4^-$, $PF_6^-$, $BF_3Cl^-$ and $PF_5Cl^-$.

11. The block polymer according to claim 6,
wherein the (c1) comprises at least one divalent hydrocarbon group selected from the groups consisting of divalent hydrocarbon groups, hydrocarbon groups containing an ether, thioether, carbonyl, ester, imino, amide, imide, urethane, urea, carbonate and/or siloxy linkage and hydrocarbon groups having a heterocyclic ring structure containing a nitrogen and/or oxygen atom.

12. The block polymer, according to claim 1,
wherein the (b) is an anionic polymer (b4) comprising a sulfonyl group-containing dicarboxylic acid (e1) and a diol (b0) or polyether (b1), as an essential constituent unit, and 2 to 80 sulfonyl groups within the molecule.

13. The block polymer according to claim 12,
wherein the (b) comprises, as an essential constituent thereof, the (e1) and a compound selected from the group consisting of alkanediols containing 2 to 10 carbon atoms, polyethylene glycols and bisphenol-ethylene oxide adducts.

14. A block polymer (A2),
which has a structure such that a block of polyolefin (a) and a block of hydrophilic polymer (b) having a volume resistivity of $10^5$ to $10^{11}$ Ω·cm are bound together in the manner of (a)-(b) or (a)-(b)-(a), wherein said polymer (b) is a polyether-containing hydrophilic polymer (b2) selected from the group consisting of polyetheresteramides (b2-1), polyetheramideimides (b2-2), polyetheresters (b2-3), polyetheramides (b2-4) and polyetherurethanes (b2-5).

15. The block polymer according to claim 14,
wherein the (a) is a polyolefin (a4) represented by any of the following general formulas (9) to (11) and having a carbonyl group at one polymer terminus:

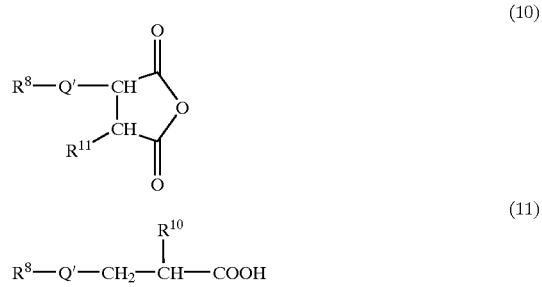

in which R⁸ is a polyolefin residue, Q' is a group represented. by the formula —CH(R¹⁰)—CH═C(R¹⁰)—CH₂—, R⁹ is a trivalent hydrocarbon group containing 2 or 3 carbon atoms, R¹⁰ is a hydrogen atom or an alkyl group containing 1 to 10 carbon atoms and R¹¹ is a hydrogen atom or a methyl group.

16. The block polymer according to claim 14,
wherein the (b) is a polymer (b2) represented by the following general formula (19):

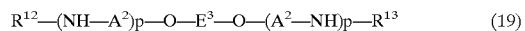

in which E³ represents the residue of a polyether group-containing hydrophilic polymer, R¹² and R¹³ each represents a hydrogen atom or a group represented by the formula —CO—NH—E²—NHCOO—R¹⁴—NH₂, —CO—NH—E²—NCO, —G or —CH₂CH(OH)CH₂—O—E⁴—O—G, p is 0 or 1, A² is an alkylene group containing 2 to 4 carbon atoms or a group represented by the formula —(R¹⁵—CO)r—, R¹⁴ represents a divalent hydrocarbon group containing 2 to 12 carbon atoms, R¹⁵ represents a divalent hydrocarbon group containing 1 to 11 carbon atoms, r is an integer of 1 to 10, E² represents the residue of an organic diisocyanate, G represents a glycidyl group and E⁴ represents the residue of a diglycidyl ether (GOE⁴OG) after removal of the glycidyloxy groups.

17. The block polymer according to claim 16,
wherein the E³ is represented by the following general formula (20):

in which E⁵ is the residue of a polyether (b1), D is an oxygen atom and/or an imino group, Z is the segment of apolymer selected from the group consisting of polyester amides, polyamide imides, polyesters, polyamides and polyurethanes, u is an integer of 0 or 1 and w is an integer of 2 to 50.

18. The block polymer according to claim 17,
wherein the Z is a segment represented by any of the following general formulas (21) to (27):

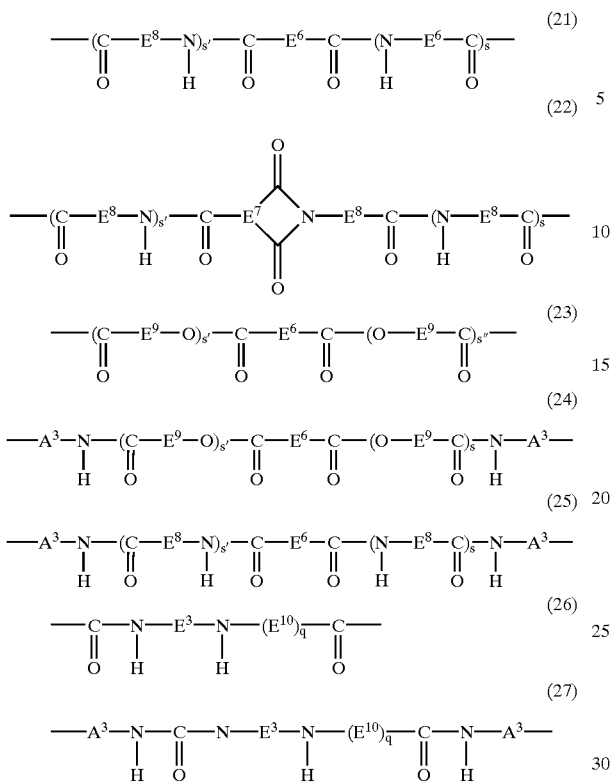
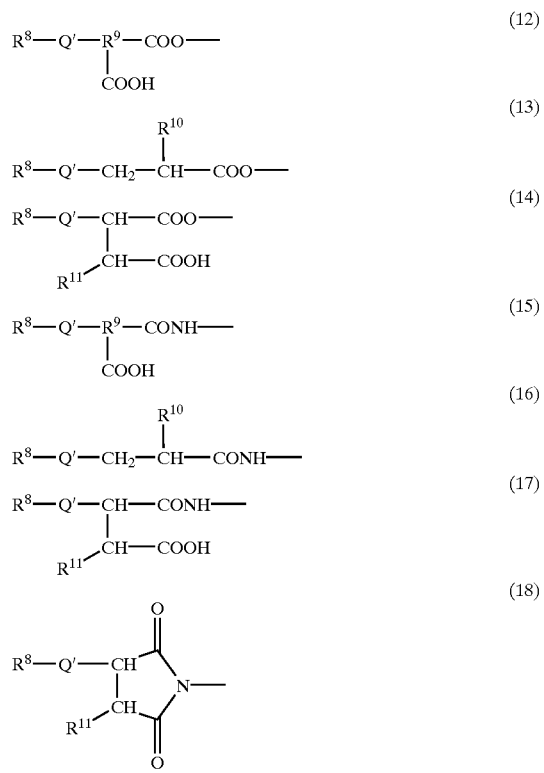

in which $E^6$ is the residue of a dicarboxylic acid containing 4 to 20 carbon atoms after removal of the carboxyl groups, $E^7$ is the residue of a tribasic or tetrabasic aromatic carboxylic acid after removal of three carboxyl groups, $E^8$ is the residue of a polyamide constituent selected from the group consisting of monoamides derived from a dicarboxylic acid containing 4 to 12 carbon atoms and a diamine (Q1-3) containing 2 to 12 carbon atoms and aminocarboxylic acids containing 6 to 20 carbon atoms after removal of the terminal amino and carboxyl groups, $E^9$ is the residue of a polyester constituent selected from the group consisting of esters of a dicarboxylic acid containing 4 to 12 carbon atoms and a diol (b0) containing 2 to 12 carbon atoms and hydroxy carboxylic acids containing 6 to 12 carbon atoms after removal of the terminal hydroxyl and carboxyl groups, s, s' and s" each is an integer of 0 or 1 to 50, (s+s') is at least one, $A^3$ is an alkylene group containing 2 to 4 carbon atoms or a group represented by the formula —$R^{16}$—CO—, $R^{16}$ is a divalent hydrocarbon group containing 1 to 11 carbon atoms, q is an integer of 0 or 1 to 10, $E^{10}$ is a group represented by the formula —CO—D—$E^{11}$—D—CO—NH—$E^2$—NH—, $E^2$ is the residue of an organic diisocyanate, D is an oxygen atom and/or an imino group and $E^{11}$ is the residue of a chain extender.

19. The block polymer according to claim 14, wherein the structure (a)-(b) or (a)-(b)-(a) is a structure such that one or both termini of said polymer (b) have been replaced by a group containing a residue of the polyolefin (a), represented by any of the following general formulas (12) to (18):

in which $R^8$ is a polyolefin residue, Q' is a group represented by the formula —CH($R^{10}$)—CH=C($R^{10}$)—CH$_2$—, $R^9$ is a trivalent hydrocarbon group containing 2 or 3 carbon atoms, $R^{10}$ is a hydrogen atom or an alkyl group containing 1 to 10 carbon atoms and $R^{11}$ is a hydrogen atom or a methyl group.

20. The block polymer according to claim 19, wherein the polyolefin residue $R^8$ is represented by the formula $R^{17}$—[CH($R^8$)—CH($R^{19}$)]y—, in which $R^{17}$ represents a hydrogen atom or a group represented by CH$_2$=CH—, one of $R^{18}$ and $R^{19}$ represents a hydrogen atom and the other represents a hydrogen atom or an alkyl group containing 1 to 10 carbon atoms, and y represents an integer of 15 to 800.

21. An antistatic agent which comprises the (A) according to claim 1.

22. An antistatic resin composition which comprises the (A) according to claim 1 and a thermoplastic resin (B).

23. The resin composition according to claim 22, wherein the (B) comprises a polyolefin resin (B1).

24. The resin composition according to claim 22, wherein the (B) comprises the polyolefin resin (B1) and at least one resin (BB) selected from the group consisting of polyamide resins (B5), plyester resins (B6) and plyacetal resins (B7), the content of (BB) being 1 to 20 parts by weight per 100 parts by weight of the (B1).

25. The resin composition according to claim 22 which comprises at least one selected from the group consisting of alkaline metal or alkaline earth metal salts (C), surfactants (D), compatibilizers (E) and other high-molecular antistatic agents.

26. A molded product obtained by coating or printing a molding comprised of a resin composition containing the block polymer (A) according to claim 1.

27. A block polymer (A) which has a structure such that a block of a polyolefin (a) and a block of a hydrophilic polymer (b) having a volume resistivity of $10^5$ to $10^{11}$ Ω·cm are bound together alternately or repeatedly, wherein said polymer (b) is selected from the group consisting of a cationic polymer (b3) containing, within the molecule thereof, 2 to 80 cationic groups (c2) separated by a nonionic molecular chain (c1), and an anionic polymer (b4) comprising a sulfonyl group-containing dicarbocylic acid (e1) and a diol (b0) or polyether (b1), as an essential constituent unit, and 2 to 80 sulfonyl groups within the molecule.

28. The block polymer according to claim 16, wherein $R^{12}$ and $R^{13}$ are a hydrogen atom and/or a group represented by the formula —CO—NH—$E^2$—NCO.

29. The block polymer according to claim 18, wherein Z is a polyester amide segment represented by the general formula (21).

* * * * *